United States Patent
Hermans et al.

(10) Patent No.: US 11,213,783 B2
(45) Date of Patent: Jan. 4, 2022

(54) DRYER FOR DRYING COMPRESSED GAS AND METHOD OF REGENERATING A DESICCANT MATERIAL COMPRISED WITHIN SAID DRYER

(71) Applicant: ATLAS COPCO AIRPOWER, NAAMLOZE VENNOOTSCHAP, Wilrijk (BE)

(72) Inventors: Hans Maria Karel Hermans, Wilrijk (BE); Dirk Emiel E. Carpels, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 139 days.

(21) Appl. No.: 16/088,621

(22) PCT Filed: Mar. 28, 2017

(86) PCT No.: PCT/IB2017/051752
§ 371 (c)(1),
(2) Date: Sep. 26, 2018

(87) PCT Pub. No.: WO2017/175093
PCT Pub. Date: Oct. 12, 2017

(65) Prior Publication Data
US 2019/0105595 A1    Apr. 11, 2019

Related U.S. Application Data

(60) Provisional application No. 62/320,176, filed on Apr. 8, 2016.

(30) Foreign Application Priority Data

Dec. 7, 2016  (BE) .................................... 2016/5906

(51) Int. Cl.
*B01D 53/047* (2006.01)
*B01D 53/04* (2006.01)
*B01D 53/26* (2006.01)

(52) U.S. Cl.
CPC ....... *B01D 53/047* (2013.01); *B01D 53/0446* (2013.01); *B01D 53/261* (2013.01);
(Continued)

(58) Field of Classification Search
CPC ............ B01D 53/0407; B01D 53/0415; B01D 53/0423; B01D 53/0446; B01D 53/047;
(Continued)

(56) References Cited

U.S. PATENT DOCUMENTS 3,037,528 A * 6/1962 Baars .................. G05D 7/0133
138/46
3,069,830 A   12/1962 Skarstrom et al.
(Continued)

FOREIGN PATENT DOCUMENTS

| CN | 202376897 U | 8/2012 |
| EP | 1362629 A1 | 11/2003 |
| EP | 2407231 A1 | 1/2012 |
| WO | 9007970 A1 | 7/1990 |

OTHER PUBLICATIONS

International Search Report in related PCT Application No. PCT/IB2017/051752, dated Jun. 2, 2017.
(Continued)

*Primary Examiner* — Jonathan Luke Pilcher
(74) *Attorney, Agent, or Firm* — Bacon & Thomas, PLLC

(57) ABSTRACT

The present invention is directed to a dryer provided with an inlet for receiving a flow of compressed gas and an outlet for providing dry air, said dryer comprising: a first and a second adsorption vessel connected in parallel, a depressurization unit connectable to the inlet flow conduit of each of said first and second adsorption vessels;
(Continued)

whereby the dryer further comprises a flow reducer connectable to the inlet flow conduit of each of the first and second adsorption vessels and whereby said control valves are adapted to be switched in a first state, and a second state.

15 Claims, 19 Drawing Sheets

(52) U.S. Cl.
CPC ............... *B01D 2259/402* (2013.01); *B01D 2259/40003* (2013.01); *B01D 2259/404* (2013.01); *B01D 2259/40013* (2013.01); *B01D 2259/40028* (2013.01); *B01D 2259/40035* (2013.01); *B01D 2259/40052* (2013.01); *B01D 2259/4062* (2013.01); *B01D 2259/4065* (2013.01)

(58) Field of Classification Search
CPC ............ B01D 53/0473; B01D 53/0476; B01D 53/261; F16K 1/523; F16K 15/023; F16K 15/025; F16K 15/026; F16K 15/028; F16K 11/044; F16K 31/613; F16K 31/0617; F16K 31/0627; F16K 1/306; F16K 1/44; F16K 1/446; G05D 16/04; G05D 16/0608; G05D 16/063; G05D 16/0636; G05D 16/101; G05D 16/103; G05D 16/106; G05D 16/107; G05D 16/12; G05D 7/126; G05D 7/0133; G05D 7/014; F24F 11/74
USPC .......................................................... 138/45
See application file for complete search history.

(56) References Cited

U.S. PATENT DOCUMENTS

| 3,122,162 | A | * | 2/1964 | Sands | G05D 7/0133 137/498 |
| 3,365,861 | A | * | 1/1968 | Crowley | B01D 53/0454 96/115 |
| 4,247,311 | A | * | 1/1981 | Seibert | B01D 53/0446 96/111 |
| 4,479,815 | A | * | 10/1984 | Tinker | B01D 53/0454 96/116 |
| 4,546,442 | A | * | 10/1985 | Tinker | B01D 53/0454 700/266 |
| 4,605,425 | A | * | 8/1986 | Verrando | B01D 53/0454 95/10 |
| 4,718,020 | A | * | 1/1988 | Duich | B01D 53/0454 700/271 |
| 4,950,311 | A | * | 8/1990 | White, Jr. | B01D 53/047 95/122 |
| 9,568,112 | B2 | * | 2/2017 | Walker | B01D 53/0446 |
| 2006/0230939 | A1 | | 10/2006 | Bliss et al. | |
| 2011/0277630 | A1 | | 11/2011 | Greenough | |

OTHER PUBLICATIONS

Written Opinion in related PCT Application No. PCT/IB2017/051752, dated Jun. 2, 2017.
International Preliminary Report on Patentability in related PCT Application No. PCT/IB2017/051752, dated Jul. 10, 2018.
Brazilian Office Action in related Brazilian Application No. BR112018070639-6, published Jun. 1, 2021.

* cited by examiner

DRYER FOR DRYING COMPRESSED GAS AND METHOD OF REGENERATING A DESICCANT MATERIAL COMPRISED WITHIN SAID DRYER

This invention relates to a dryer provided with an inlet for receiving a flow of compressed gas and an outlet for providing dry air, said dryer comprising: a first and a second adsorption vessel connected in parallel, each of said first and second adsorption vessels comprising: an inlet flow conduit connected to said inlet and an outlet flow conduit connected to said outlet for allowing a flow of compressed gas therethrough, a desiccant material provided therein, a control valve provided on said inlet flow conduit, and an outlet valve provided on said outlet flow conduit; and a depressurization unit connectable to the inlet flow conduit of each of said first and second adsorption vessels.

BACKGROUND OF THE INVENTION

Adsorption dryers incorporated in compressed air systems for drying a flow of compressed gas are currently used in the industry.

Such dryers comprising at least two vessels connected in parallel, and being subjected to adsorption and regeneration phases in a cyclic manner. Accordingly, when one vessel is in an adsorption phase the other one is in regeneration phase.

Typically, such systems use a shuttle valve between the source of compressed gas and the two vessels, such shuttle valve allowing the flow of compressed gas to go through one of the two vessels, while the other one is maintained in a regeneration phase in which a flow of gas is passing through the vessel from the outlet to the inlet, and moisture is eliminated through a valve mounted at the inlet. The system needs to maintain such a flow for a minimum amount of time in which the desiccant comprised within such vessel is regenerated and the vessel is prepared for a subsequent adsorption phase.

After the vessel is regenerated, the valve at the inlet connecting the vessel with an unloading unit is closed, the pressure within the regenerated vessel increases until reaches the same pressure as within the vessel being in adsorption phase. Further, the shuttle valve shifts after the valve at the inlet of the vessel previously being in adsorption phase and connecting the vessel with the unloading unit opens. Consequently the flow of compressed gas is allowed to go through the regenerated vessel and the other vessel is subjected to a regeneration phase.

Tests have shown that such a system is not providing the best results under all flow conditions, due to the usage of the shuttle valve between the two vessels. Such shuttle valve comprising a ball which is shifted to block one of the two flow conduits connected to each of the two vessels, based on pressure differences between the flow of compressed gas and the pressure value within each of the two adsorption vessels. It has been seen that such shuttle valve allows under certain conditions a flow of compressed gas into both adsorption vessels at the same time. Because of this the desiccant material comprised within the two adsorption vessels is not completely regenerated, eventually becomes saturated and the adsorption dryer is not able to adsorb moisture from the flow of compressed gas anymore.

Another drawback associated with the usage of such a shuttle valve is the big pressure drop within the adsorption vessel, due to its limitations in design. Accordingly, for high capacity vessels, such a shuttle valve should be designed of a significantly big diameter in order to overcome such a pressure drop, and tests have shown that such a modification is simply not achievable.

Yet another drawback of such a shuttle valve is that, with adsorption dryers functioning at a very high flow, such a valve would simply not work, since higher flows would mean higher forces needed to be overcome by the ball blocking one of the two flow conduits. Tests have shown that with higher flows, these forces can no longer be overcome and the ball would be positioned such that a flow of compressed air is allowed to reach both vessels at the same time, damaging the desiccant material and possibly also the walls of the adsorption vessels due to the corrosive effect of moisture gathering therein.

Other prior art systems use a diverter valve to select a flow path through which the flow of compressed gas is directed, like the one disclosed in US 2014,237,962 A, filed by Graham White Manufacturing Company. The dryer disclosed therein uses two exhaust valves connected at each inlet of the two adsorption vessels, said exhaust valves having two positions: an open one in which fluid can flow out of a vessel and a shut one in which fluid is prevented to flow out of said vessel.

Such a dryer however does not protect the desiccant material provided within the two vessels from a high flow of compressed gas. For such a dryer, tests have shown that, due to a high flow of compressed air, the plurality of desiccant beads comprised within the two vessels collide with each other. And due to these collisions and the friction created between these desiccant beads, the desiccant material gets damaged and eventually destroyed, and the dryer is not functioning properly anymore.

SUMMARY OF THE INVENTION

Taking the above mentioned drawbacks into account, it is an object of the present invention to provide a dryer comprising at least two adsorption vessels provided with a desiccant material capable of easily selecting the desired flow path for the flow of compressed gas.

It is another object of the present invention to provide a dryer for which the pressure drop within the vessels is controlled such that the desiccant material is protected when such vessels shift from an adsorbing phase into a regenerating phase and vice versa, or when the volumetric flow of compressed gas changes.

Further, the dryer of the present invention is suitable to be used with relatively low flows of compressed gas as well as with relatively high flows of compressed gas. At the same time, and irrespective of the volumetric flow of compressed gas, the desiccant material inside the vessels is efficiently regenerated during the regeneration phase.

Moreover, the solution proposed by the present invention is suitable for very high flows of compressed air and adsorption vessels of high volumes.

The dryer of the present invention is offering a simple to implement solution, facilitating maintenance and achieving a better response time with a better quality of the dry air provided at its outlet.

Moreover, the dryer of the present invention has a much longer life span and is more efficient than the existing solutions.

The present invention solves at least one of the above and/or other problems by providing a dryer provided with an inlet for receiving a flow of compressed gas and an outlet for providing dry air, said dryer comprising:

a first and a second adsorption vessel connected in parallel, each of said first and second adsorption vessels comprising: an inlet flow conduit connected to said inlet and an outlet flow conduit connected to said outlet for allowing a flow of compressed gas therethrough, a desiccant material provided therein, a control valve provided on said inlet flow conduit, and an outlet valve provided on said outlet flow conduit;

a depressurization unit connectable to the inlet flow conduit of each of said first and second adsorption vessels;

whereby:

the dryer further comprises a flow reducer connectable to the inlet flow conduit of each of the first and second adsorption vessels and allowing a flow of fluid therethrough and in that, said control valves are adapted to be switched in a first state in which compressed gas is allowed to flow through the inlet flow conduit of one of said adsorption vessels, and a second state in which one or both of said inlet flow conduits is in fluid connection with the depressurization unit.

Indeed, by including a control valve on each of the inlet flow conduits of the first and second adsorption vessel, the dryer eliminates the risk of having compressed gas flowing through both vessels at the same time irrespective of any changes in volumetric flow of the compressed gas, by simply switching one of the control valves in a first state and the other control valve in a second state, the flow path for the compressed gas is selected through only one of the two adsorption vessels. Accordingly, the regeneration of the desiccant material comprised within said two adsorption vessels is properly performed, and optimum results of the dryer are maintained throughout the functioning of said dryer.

Furthermore, because of the inclusion of such control valves, the switching between a first state and a second state is performed in a controlled manner, no longer being dependent on the pressure difference between the two adsorption vessels.

By including a flow reducer connectable to the inlet flow conduit of each of the first and second adsorption vessels, the speed of the compressed gas entering within the first and the second adsorption vessels and therefore the pressure drop therein is controlled and the risk of damages to the desiccant beads comprised therein is eliminated.

Accordingly, irrespective of the volumetric flow of compressed gas, the speed of the compressed gas entering within the adsorption vessel subjected to an adsorption phase and the speed of the compressed gas exiting the adsorption vessel subjected to a regeneration phase are controlled not to suddenly increase. Because of this, the desiccant beads are protected in both adsorption vessels and the dryer of the present invention is a suitable flexible solution for many types of applications requiring different pressures and volumes of gas at the outlet of the dryer.

Preferably, when one of said first and second adsorption vessels is maintained in an adsorption phase, the other adsorption vessel is maintained in a regenerating phase. Accordingly, when one control valve is maintained in a first state the other one is preferably maintained in a second state and vice versa.

Typically, when one of the first or second adsorption vessel is maintained in a regeneration phase, a flow of gas is maintained from the outlet flow conduit towards the inlet flow conduit of said adsorption vessel and moisture is eliminated through the inlet flow conduit and out of the adsorption vessel, into the outside environment.

If such an adsorption vessel would be simply connected to the outside environment, the pressure difference between the pressure value of the outside environment and the pressure value within said adsorption vessel would be too big, and a sudden high flow of gas through the desiccant material would be created, which would damage or even destroy it due to the friction and collisions between the desiccant beads.

Another unwanted effect achievable if the adsorption vessel would be simply connected to the outside environment is the generation of a very loud sound which would limit the usage of the dryer due to environmental regulations. By using a flow reducer, the pressure drop within the adsorption dryer is controlled, and the sound generated by a dryer according to the present invention is very low, allowing such dryer to be used in all types of applications.

In a preferred embodiment according to the present invention said outlet valves provided on the outlet flow conduits of each of said adsorption vessels are one way valves. Because of this, the flow of gas flowing from the adsorption vessel subjected to an adsorption phase is not completely flowing through the adsorption vessel subjected to a regeneration phase, but it is directed through the outlet of the dryer and used by a user of dry compressed gas.

Preferably, the dryer further comprises a nozzle positioned on a flow conduit, said flow conduit connecting the outlet flow conduit of the first adsorption vessel with the outlet flow conduit of the second adsorption vessel such that a minimum flow of dry gas is allowed to flow through the adsorption vessel being subjected to a regeneration phase, for regenerating the desiccant material comprised therein.

The present invention is further directed to a method of regenerating a desiccant material comprised within at least two adsorption vessels of a dryer, said adsorption vessels being connected in parallel, said method comprising the following steps:

bringing an outlet of a compressor unit in fluid communication with an inlet flow conduit of a first adsorption vessel through a first control valve connected on said inlet flow conduit, said first control valve being in a first state;

bringing an inlet flow conduit of a second adsorption vessel in fluid connection with a depressurization unit through a second control valve, said second control valve being connected on the inlet flow conduit of said second adsorption vessel and being in a second state;

allowing a minimum flow of dry gas to flow from an outlet flow conduit of the first adsorption vessel through an outlet flow conduit of the second adsorption vessel, whereby a flow of gas is maintained from the outlet flow conduit towards the inlet flow conduit of said second adsorption vessel and moisture is eliminated through the inlet flow conduit (9) and out of the adsorption vessel (8), into the outside environment;

whereby the method further comprises the step of adapting the pressure drop within the second adsorption vessel by means of a flow reducer comprising a perforated disk (19), said flow reducer (14) being adapted to be connected to the inlet flow conduit of said second adsorption vessel.

The present invention is further directed to a method of manufacturing an adsorption dryer, the method comprising the steps of:

connecting a first and a second adsorption vessel in parallel;

providing a desiccant material within each of the first and second adsorption vessel;

mounting a control valve on an inlet flow conduit of each of the first and second adsorption vessel, and further mounting an outlet valve on an outlet flow conduit of each of the first and second adsorption vessel;

providing a depressurization unit connectable to the inlet flow conduit of each of said first and second adsorption vessels;

whereby the method further comprises the step of providing a flow reducer and connecting it to the inlet flow conduit of each of the first and second adsorption vessels; and whereby the mounting of a control valve on the inlet flow conduit comprises the step of directly mounting each of said first and second adsorption vessel onto a respective control valve.

BRIEF DESCRIPTION OF THE DRAWINGS

With the intention of better showing the characteristics of the invention, some preferred configurations according to the present invention are described hereinafter by way of an example, without any limiting nature, with reference to the accompanying drawings, wherein.

DETAILED DESCRIPTION OF THE INVENTION

Figure 1:
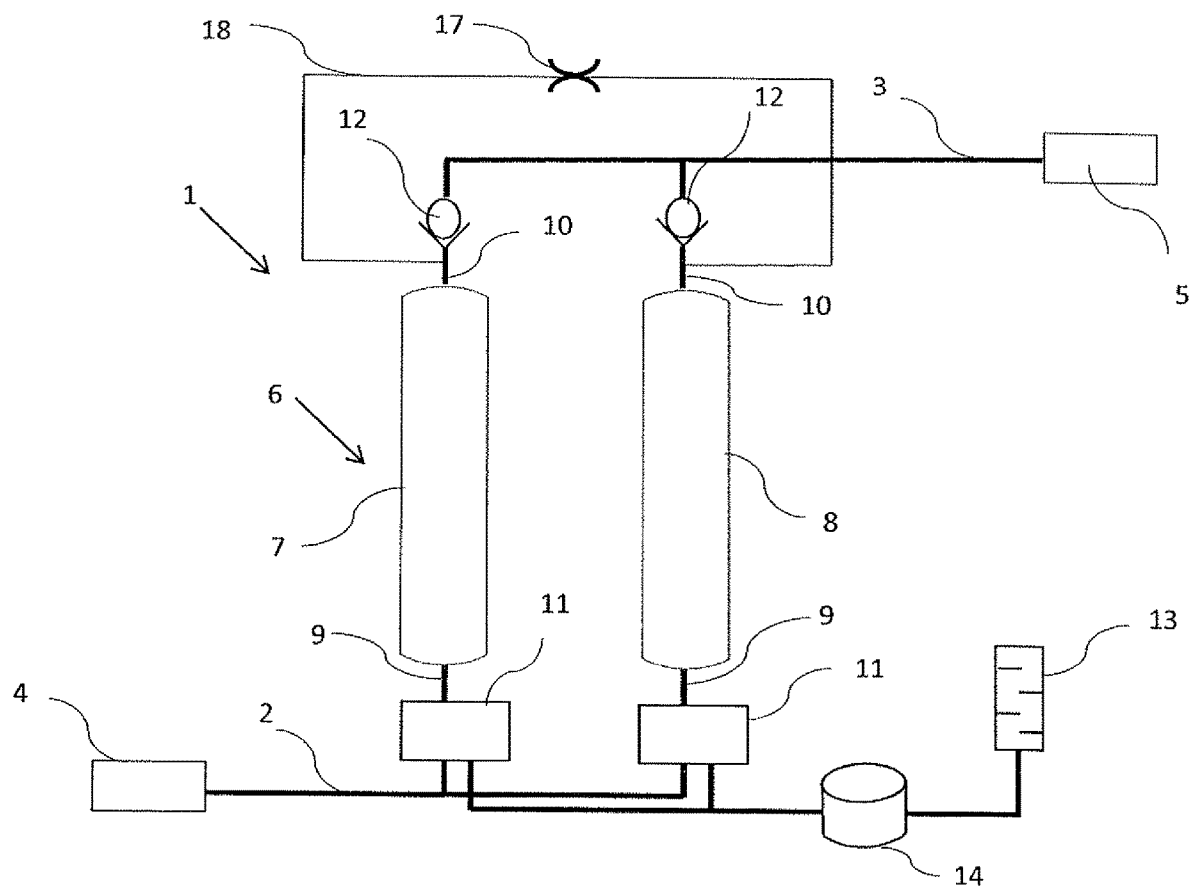
FIG. 1 schematically represents a dryer according to an embodiment of the present invention.

FIG. 1 illustrates a dryer 1 according to the present invention, said dryer 1 having an inlet 2 for receiving a flow of compressed gas from a compressor unit 4 and an outlet 3 for providing dry air to a user 5 of compressed gas.

The dryer 1 further comprises at least two adsorption vessels 6: a first adsorption vessel 7 and a second adsorption vessel 8, connected in parallel.

In the context of the present invention it should be understood that said adsorption vessels 6 can have any shape such as cylindrical, rectangular or any other shape. Further such adsorption vessels 6 can be in the shape of extrusion profiles.

The example shown in FIG. 1 comprises only two adsorption vessels 7 and 8 but the present invention should not be limited to such a layout. It should be understood that the present invention is implementable for a dryer comprising more adsorption vessels 6 connected in parallel such as three, four, six, eight or any other number of adsorption vessels 6.

Each of said first and second adsorption vessels, 7 and 8, comprises: an inlet flow conduit 9 connected to said inlet 2 and an outlet flow conduit 10 connected to said outlet 3 for allowing a flow of compressed gas therethrough, a desiccant material not shown) provided therein, a control valve 11 provided on said inlet flow conduit 9, and an outlet valve 12 provided on said outlet flow conduit 10.

Each of said control valves 11 are adapted to be switched in a first state in which compressed gas is allowed to flow through the inlet flow conduit 9 of one of said adsorption vessels, 7 or 8, and a second state in which one or both of said inlet flow conduits 9 is in fluid connection with the depressurization unit 13.

The dryer 1 preferably further comprises a depressurization unit 13 connectable to the inlet flow conduit 9 of each of said first and second adsorption vessels, 7 and 8.

Further, the dryer 1 preferably comprises a flow reducer 14 connectable to the inlet flow conduit 9 of each of the first and second adsorption vessels, 7 and 8, and allowing a flow of fluid therethrough.

Accordingly, because the dryer 1 comprises both: a flow reducer 14 and a depressurization unit 13 connectable to the inlet flow conduit 9 of each of said first and second adsorption vessels 7 and 8, the pressure drop within each of said first and second adsorption vessels and 8, is easily controlled when said first or second adsorption vessel 7 or 8 is brought in a regeneration phase.

Preferably, each of said outlet valves 12 are one way valves, preferably allowing a fluid flow from either the first or the second adsorption vessel 7 or 8, depending on which outlet flow conduit 10 such outlet valve 12 is connected to, and the user 5 of compressed dry gas.

In a preferred embodiment, said control valve 11 is a two-way valve, allowing in a first state the flow of compressed gas from the compressor unit 4 to flow through the adsorption vessel 7 or 8, and allowing in a second state for the depressurization unit 13 to be brought in fluid communication with the inlet flow conduit 9 of said adsorption vessel 7 or 8.

Preferably, but not limiting to, only one inlet conduit 9 of one adsorption vessel 7 or 8 is brought in fluid connection with the depressurization unit 13 at one time.

Figure 2:
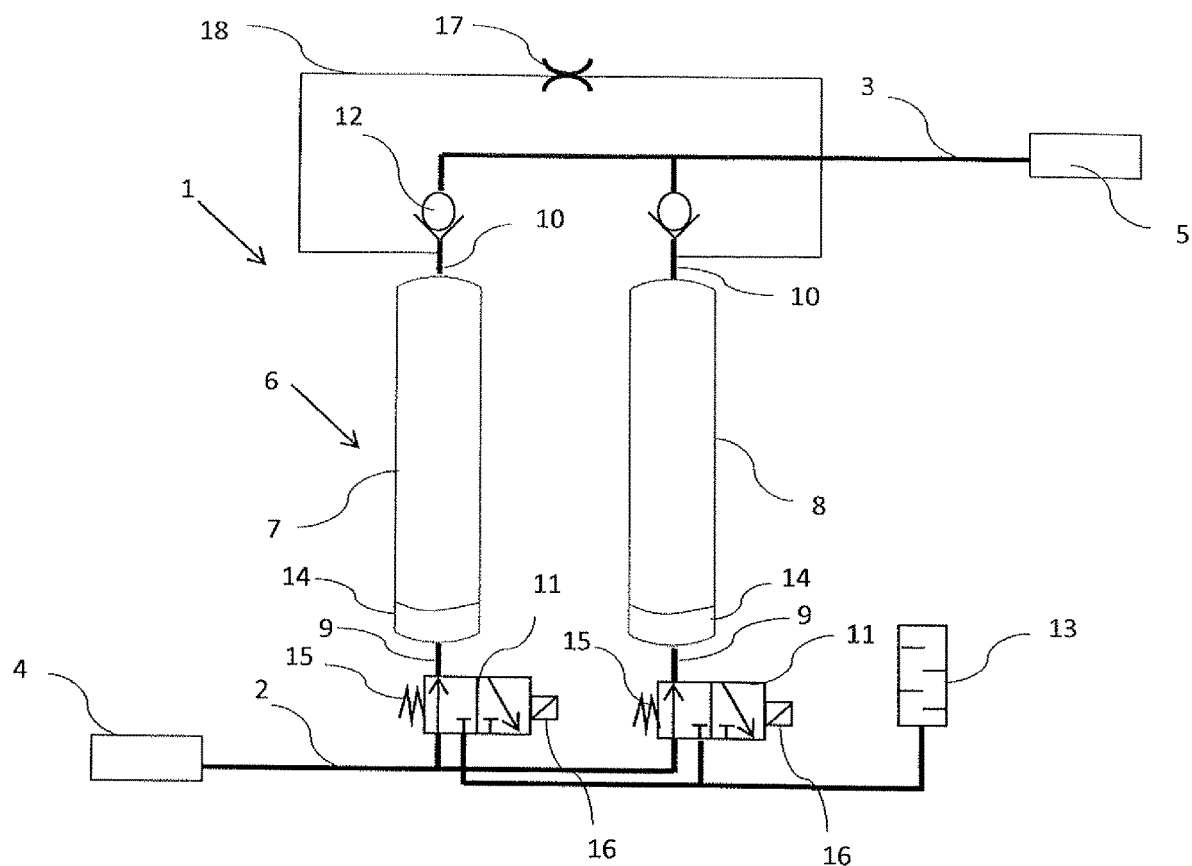
FIG. 2 schematically represents a dryer according to another embodiment of the present invention.

Preferably, but not limiting to, said control valve 11 can be of a type comprising 3 electrical connections and 2 states, like illustrated in FIG. 2. However, the scope of this invention should by no means be limited to such a control valve 11, and it should be understood that any type of valve achieving the above effect can be used.

In a preferred embodiment, but not limiting thereto, for a much more simplified mounting technique, the control valve is designed as a manifold directly connected to the inlet flow conduit 9 of the adsorption vessels 6. In other words, the adsorption vessel 6 rests directly onto the control valve 11.

For a simpler layout, the manifold creates the frame on which the adsorption vessel 6 is mounted.

Such a layout facilitates a much easier maintenance of the dryer due to a much easier access to its components. Moreover, each adsorption vessel 6 can be accessed individually. Accordingly, if the desiccant material comprised within one of said adsorption vessels 6, or if either one of: the control valve 11, the outlet valve 12 or any one of the flow conduits or connections, needs to be accessed for maintenance, the control valve 11 can be switched in the state in which compressed gas is not allowed to flow through such adsorption vessel 6, and all the components connected to it can be easily accessed.

Accordingly, if one of the adsorption vessels 6 is in need of an intervention by a service technician, it can be easily isolated, while the other adsorption vessel or vessels 6 continue to function in normal conditions. Because of this, a user of a dryer 1 according to the present invention is not impacted at all by the maintenance process.

In another embodiment according to the present invention, the adsorption dryer 1 can comprise more tan two adsorption vessels 6. The layout on the inlet flow conduit and the outlet flow conduit 10 for each adsorption vessel 6 remaining the same as for the case of two adsorption vessels 6, as illustrated in FIG. 1.

Because each of such adsorption vessels 6 comprises a control valve 11, the dryer 1 according to the present invention can be easily adapted to work while connected to a compressor unit 4 delivering a very high flow of compressed gas or to a compressor unit 4 delivering a relatively low flow of compressed gas.

Accordingly, when the dryer 1 is connected to a very high flow of compressed gas, all adsorption vessels 6 might be required to function, while if such a dryer 1 is connected to a relatively low flow of compressed gas, some of the adsorption vessels 6 might be isolated by their respective control valves 11, until their usage would be needed. Such adsorption vessels 6 being called back-up adsorption vessels 6, ready and fully operational in case needed.

Typically, for such back-up vessels 6, the respective control valves 11 for the first adsorption vessel 7 and the second adsorption vessel 8 are switched in a second state, such that a flow of compressed gas cannot enter through their respective inlet flow conduits 9 and such control valves 11 are maintained within such a position until the back-up vessels would need to be used for drying.

Since, once switched in a second state, the respective control valves 11 are maintained within such a position until the back-up adsorption vessels 6 would need to be adsorption vessels 6 would need to be used for drying, such control valves 11 would suffer no aging process, prolonging their lifetime.

Furthermore, a dryer 1 according to the present invention can be connected to a compressor unit 4 of a variable flow of compressed gas, in which case the number of adsorption vessels 6 used can vary according to such flow.

Because of this, the dryer 1 according to the present invention functions in a very energy efficient and maintenance efficient manner, since only the minimum number of adsorption vessels 6 are used, while the others are preserved and used as back-up.

Furthermore, tests have shown that due to the layout of the control valves 11, and even if the dryer 1 comprises multiple adsorption vessels 6 functioning at the same time, the pressure drop within such adsorption vessels 6 remains approximately the same as for the case in which only two adsorption vessels 6 are mounted in parallel.

Moreover, tests have shown that, in case the flow of compressed gas increases, and the dryer 1 would use the back-up adsorption vessels 6 in parallel with the ones already active, the pressure drop across the dryer 1 shows a decrease since the flow of compressed gas is being split between a higher number adsorption vessels 6.

Figure 4:
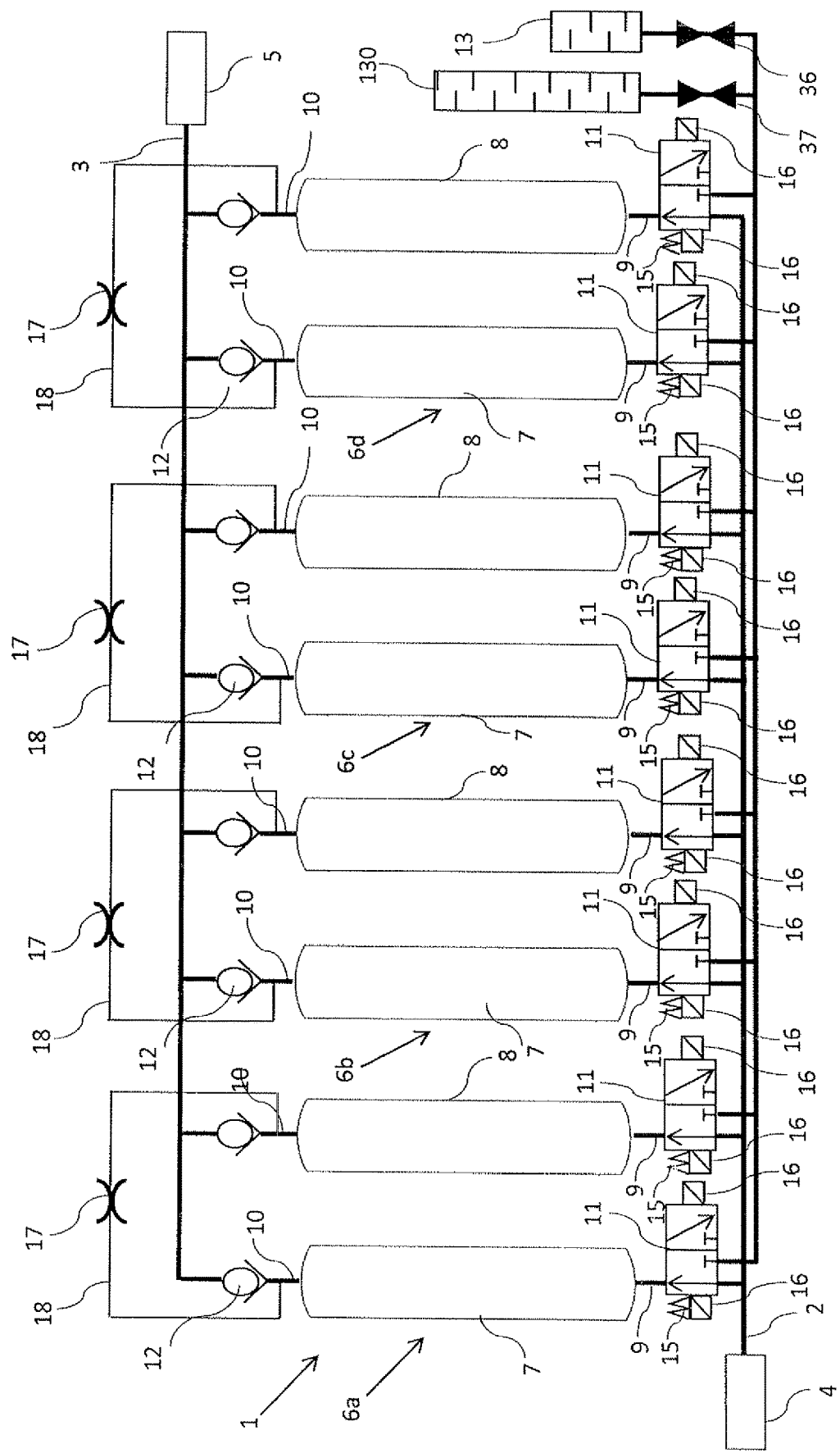
FIG. 4 schematically represents a dryer according to another embodiment of the present invention.

An example of a dryer 1 comprising multiple adsorption vessels 6 is illustrated in FIG. 4, where four pairs of two adsorption vessels 6 are being shown.

It should be understood that the number of adsorption vessels 6 can vary and the present invention should not be limited to the number of adsorption vessels 6 shown in the drawings. Further, it cannot be excluded that each pair of adsorption vessels 6 can comprise more than two adsorption vessels 6, such as for example three, four, five, six or even more.

Returning to FIG. 4, depending on the flow of compressed gas flowing through the inlet 2, either one pair of two adsorption vessels 6 can function at the same time, more preferably a minimum of two pairs of two adsorption vessels 6 will function in parallel at the same time. If the flow of compressed gas 2 is high or increases, the dryer 1 can allow for three or even all four pairs of two adsorption vessels 6 to function in parallel at the same time.

In the case in which two or more pairs of two adsorption vessels 6 are functioning at the same time, the first adsorption vessel 7 of each pair can be brought in the same phase such as for example in an adsorbing phase, whereas the second adsorption vessel 8 of each pair is in a regeneration phase or an equalizing phase.

Said equalizing phase should be understood as the phase in which a pressure equalization is being realized between the first adsorption vessel 7 and the second adsorption vessel 8, or vice versa.

In another embodiment according to the present invention, if the dryer 1 comprises two or more pairs of two adsorption vessels 2, for reducing the pressure drop during the regeneration phase, such dryer 1 preferably further comprises an additional depressurization unit 130, mounted in parallel with the existing depressurization unit 13.

Preferably, but not limiting thereto, said additional depressurization unit 130 being of a bigger capacity when compared to the existing depressurization unit 13.

In another embodiment according to the present invention, the existing depressurization unit 13 can be used at the beginning of the regeneration phase, when the pressure within the first adsorption vessel 7 or the second adsorption vessel 8 is high, whichever is subjected to a regeneration phase, such that a big pressure drop within the respective adsorption vessel 6 is avoided.

Once such high pressure is eliminated, the dryer can either activate the additional depressurization unit 130 and deactivate the existing depressurization unit 13 or can activate the additional depressurization unit 130 and keep the existing depressurization unit 13 activated.

Preferably, the dryer 1 would deactivate the existing depressurization unit 13 and activate the additional depressurization unit 130.

For easily activating and/or deactivating the depressurization unit 13 or the additional depressurization unit 130, the dryer 1 further comprises two depressurization valves: a first depressurization valve 36 mounted between the control valve 11 and the depressurization unit 13, mounted on the flow conduit reaching the depressurization unit 13 and a second depressurization valve 37, mounted between the control valve 11 and the additional depressurization unit 130, mounted on the flow conduit reaching the additional depressurization unit 130.

In yet another embodiment according to the present invention, the additional depressurization unit 130 can be of the same capacity as the existing depressurization unit 13, in which case, when the pressure within the first adsorption vessel 7 or the second adsorption vessel 8 is eliminated, the additional depressurization unit 130 can be activated and allowed to function in parallel with the existing depressurization unit 13.

In such a case only one depressurization valve is needed, being the second depressurization valve 37, mounted on the fluid conduit reaching the additional depressurization unit 130.

In the context of the present invention, said 'activating' should be understood as allowing gas to flow though the outlet flow conduit 10 of the adsorption vessel 6, further through the inlet flow conduit 9, and further through the depressurization unit 13 and/or through the additional depressurization unit 130 to reach the atmosphere. Consequently, 'deactivating' should be understood as not allowing the flow of gas flowing through the outlet flow conduit 10, further through the inlet flow conduit 9 of the adsorption vessel 6, to further flow through the depressurization unit 13 or additional depressurization unit 130 and reach the atmosphere.

In another embodiment of the present invention, the dryer 1 can comprise a controller unit (not shown) for actuating the control valves 11 in a first state and/or a second state, and further controlling the respective outlet valves 12 of each adsorption vessel 6 in accordance with the intensity of the flow of compressed gas and the phase of the adsorption vessel 6. Turning now to the design of the control valve 11, it can comprise a spring 15 and a solenoid valve 16, said solenoid valve 16, when actuated, allowing said control valve 11 to be switched from a first state, against the force of the spring 15 into the second state.

The dryer 1 switching one of the control valves 11 whenever the phase of the first or second adsorption vessels 7 or 8 needs to be changed from adsorption into regeneration or vice versa.

Figure 5:
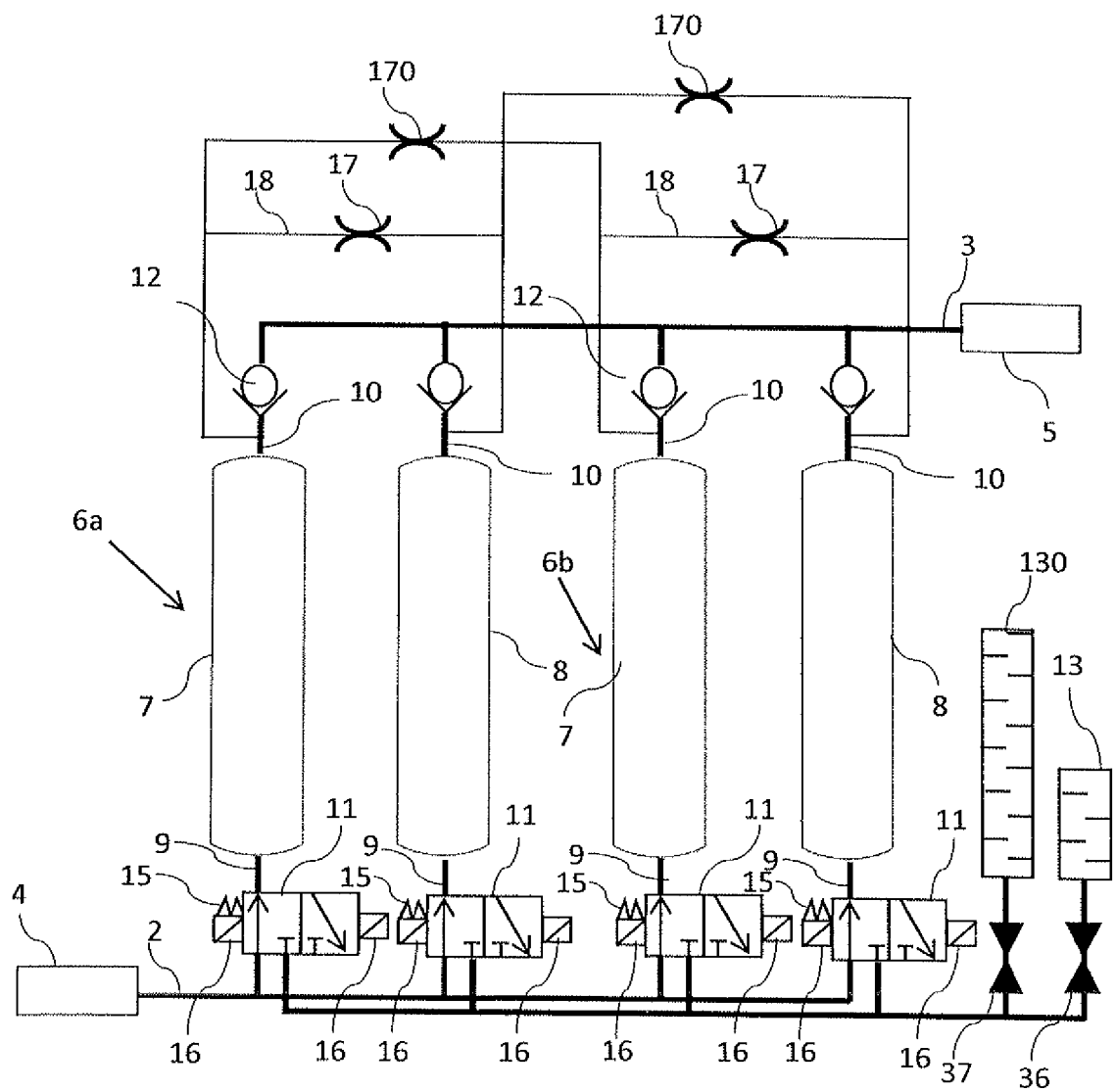
FIG. 5 schematically represents a dryer according to yet another embodiment of the present invention.
Figure 6:
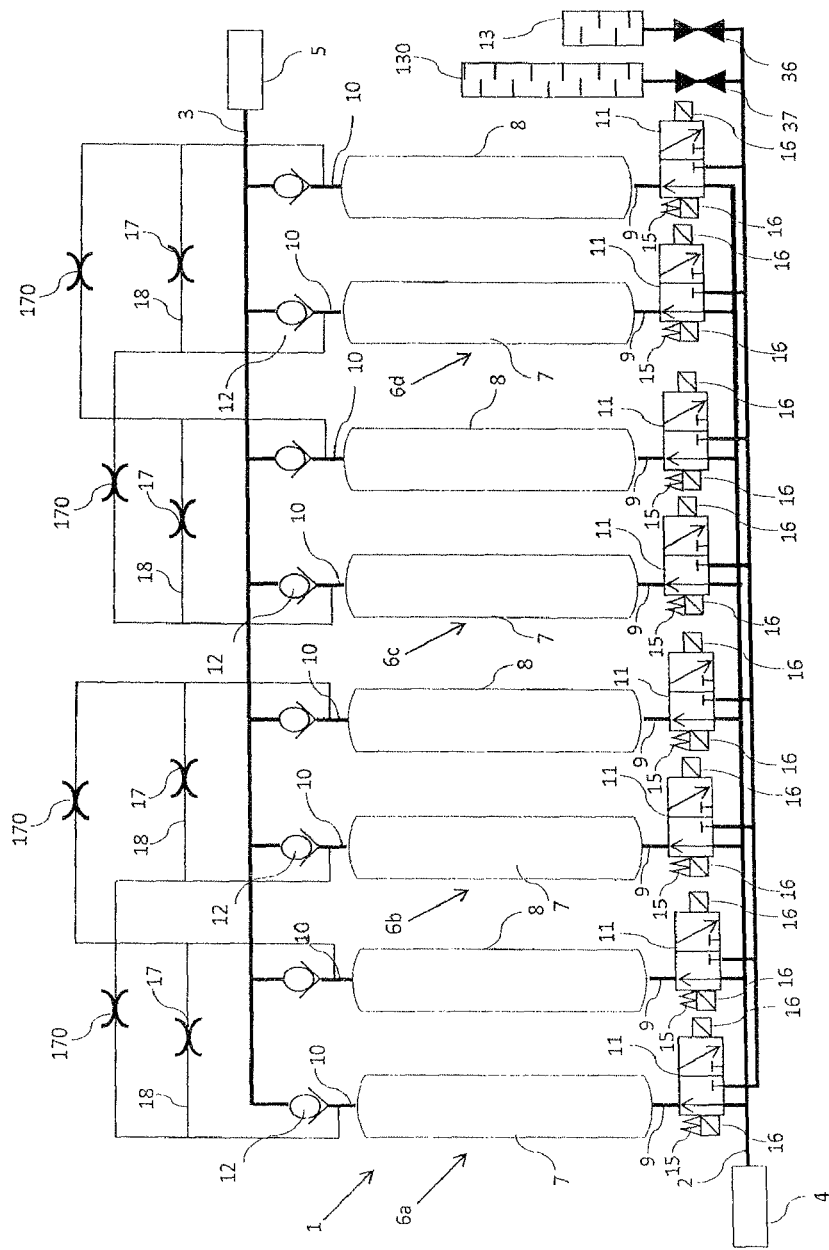
FIG. 6 schematically represents a dryer according to yet another embodiment of the present invention.

In another embodiment according to the present invention, and as shown in FIGS. 4 to 6, the control valve 11 can be manufactured as a double acting valve, comprising a solenoid valve 16 on both sides of the valve. One of the solenoid valves 16 being positioned as shown in FIG. 2 and the second solenoid valve being positioned for example on the opposite side, under the spring 15.

Depending on whether such a valve needs to be switched from a first state into a second state or from a second state into a first state, the controller unit can actuate either one solenoid valve 16 or the other.

In such a case, the spring 15 is used to switch the respective control valve 11 into a first state and bring the respective adsorption vessel into an adsorption phase when, for example, the dryer 1 is switched off or in the unlikely event of an electric failure. Such measure being a safety measure, such that the user 5 has a minimum pressure level at the outlet 3.

In another embodiment according to the present invention, the control valve 11 can be manufactured as a casted manifold. Such a casted manifold being manufactured as a one piece or multiple pieces casted components.

In the context of the present invention other manufacturing methods should not be excluded such as additive manufacturing or attaching different prefabricated components to one another.

In the context of the present invention, additive manufacturing should be understood as the process of joining materials to make objects from three dimensional model data, usually layer upon layer.

In yet another embodiment according to the present invention, both control valves 11 mounted each on the inlet flow conduit 9 of each of the two adsorption vessels 6 mounted in parallel, as illustrated in FIG. 2, are manufactured as a casted manifold and by using the same mold.

Preferably, one casted manifold is rotated 180° with respect to the other casted manifold, when the control valves 11 are mounted on the inlet flow conduits 9 of each adsorption vessel 6, in a usual manner allowing a normal functioning of such adsorption vessels 6.

Figure 3:
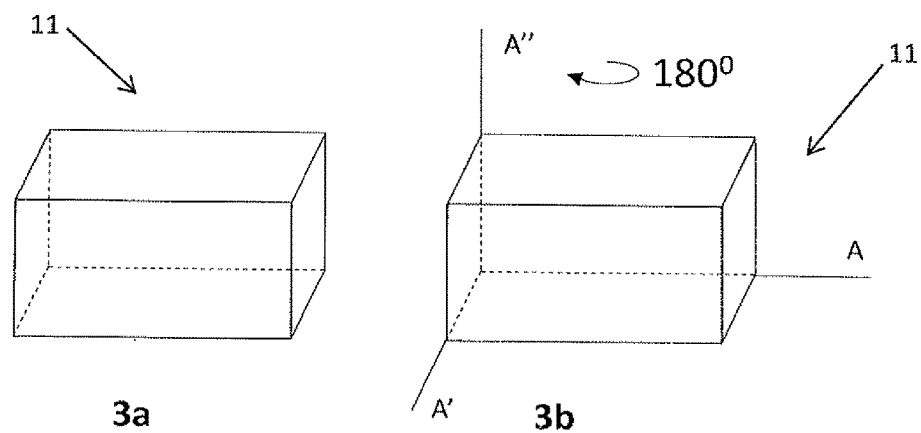
FIG. 3 schematically represents a mounting technique for a manifold according to an embodiment of the present invention.

Such a mounting technique is schematically shown in FIG. 3, whereby FIG. 3a represents the mounting position of a first casted manifold mounted for example on the inlet flow conduit 9 of the first adsorption vessel 7, and FIG. 3b represents the mounting position of the second casted manifold mounted for example on the inlet flow conduit 9 of the second adsorption vessel 8, 180° rotated with respect to the first casted manifold. The 180° rotation being performed according to the arrow shown in FIG. 3b, in the plane created by the axes AA'. Said casted manifolds being represented in a simplified manner, as parallelograms, in the typical normal mounting position and as it would be mounted on the inlet flow conduit 9 of an adsorption vessel.

An advantage thereof is the very low manufacturing cost since the same casted manifold can be used to be mounted on all adsorption vessels.

The same mounting technique being valid for each two control valves 11 mounted on the inlet flow conduit 9 of each pair of two adsorption vessels 6 as shown in FIGS. 4 to 6. Accordingly, each control valve 11 mounted on the inlet flow conduit 9 of a second adsorption vessel 8 would be rotated 180° with respect to the control valve 11 mounted on the inlet flow conduit 9 of the respective first adsorption vessel 7, and according to the arrow shown in FIG. 3b.

In another embodiment according to the present invention, the casted manifolds typically comprise a spool (not shown) received therein, said spool moving from a first state to a second state and vice-versa and allowing the flow of compressed gas to reach the respective adsorption vessel 6 or for such adsorption vessel 6 to be connected to the depressurization unit 13.

Tests have shown that, for such control valves 11, the spool is the element requiring a more frequent maintenance intervention than other components of the dryer 1. Due to the layout of the dryer 1 according to the present invention, such a spool is easily accessible and replaceable.

Furthermore, because of the adopted layout and mounting technique, such control valves 11 can even be accessed from the lateral side of the adsorption vessel 6, without the need of dismounting the dryer.

The same advantage is being encountered for the outlet valve 12, the person performing the maintenance needing to only disassemble the manifold at the top of the respective adsorption vessel 6 and access such outlet valve 12. With existing dryers, the entire unit would have to be stopped and disassembled in order to access the valves mounted on the inlet flow conduit and/or outlet flow conduit, creating a huge draw back for the user of such system and additional production costs since his production line would have had to be brought to a halt.

Preferably, for allowing a minimum flow of dry gas between the adsorption vessel 7 or 8 being in adsorption phase to flow through the other adsorption vessel 7 or 8 being in regeneration phase, the dryer 1 further comprises a nozzle 17 positioned on a flow conduit 18, said flow conduit 18 connecting the outlet flow conduit 10 of the first adsorption vessel 7 with the outlet flow conduit 10 of the second adsorption vessel 8. Preferably, such nozzle allowing a minimum flow of gas in both directions, from the adsorption vessel 6 having a higher pressure value therein to the other adsorption vessel 6 having a lower pressure value therein.

By allowing such a minimum flow of dry gas, the adsorption vessel, 7 or 8, being in regeneration phase, uses dry and possibly hot compressed gas to eliminate the moisture present within the desiccant material. Accordingly, the efficiency of the regeneration phase is increased, and the dryer uses its own capabilities to assure a continuous adsorption process.

If the adsorption dryer 1 comprises more than two adsorption vessels 6, it is preferred that each pair of two adsorption vessels 6 are connected by a flow conduit 18 comprising a nozzle 17.

In one embodiment according to the present invention, said flow conduit 18 connecting the outlet flow conduit 10 of the first adsorption vessel 7 with the outlet flow conduit of the second adsorption vessel 8 is realized in between each of said first and second adsorption vessels, 7 and 8, and each of the outlet valves 12.

It should be understood that such a flow conduit 18 can also be realized in another way without departing from the scope of the invention, such as for example: it can be connected to another outlet flow conduit (not shown) of each of the adsorption vessels 7 and 8 and interconnecting such adsorption vessels 7 and 8 at their outlets.

Preferably but not limiting thereto, said nozzle 17 is further allowing a flow of gas between the first adsorption vessel 7 and the second adsorption vessel 8 when the second adsorption vessel 8 is brought in an equalization phase while the first adsorption vessel 7 is in adsorbing phase, avoiding a big pressure increase when said second adsorption vessel would be brought in adsorption phase.

Similarly, the nozzle 17 is allowing a flow of gas between the second adsorption vessel 8 and the first adsorption vessel 7, when said first adsorption vessel 7 is brought in the equalization phase, while the second adsorption vessel 8 is in adsorption phase.

Preferably, but not limiting thereto, if the dryer 1 comprises a flow reducer 14, the equalization phase is performed through the inlet 9 of the adsorption vessel 6, whereas if the dryer 1 does not comprise a flow reducer 14, the equalization phase is performed through the nozzle 17.

In another embodiment according to the present invention, if the dryer 1 comprises at least two pairs of two adsorption vessels 6, a first pair 6a of two adsorption vessels and a second pair 6b of two adsorption vessels, such dryer can further comprise a second nozzle 170, as illustrated in FIG. 5 and FIG. 6. Said second nozzle 170 being mounted on a flow conduit between the outlet flow conduit 10 of the first adsorption vessel 7 of the first pair 6a and the outlet flow conduit 10 of the first adsorption vessel 7 of the second pair 6b.

Symmetrically, another second nozzle 170 can be provided on a flow conduit between the outlet flow conduit 10 of the second adsorption vessel 8 of the first pair 6a and the outlet flow conduit 10 of the second adsorption vessel 8 of the second pair 6b.

Said second nozzle 170 being used in case the dryer 1 is subjected to a very high flow of compressed gas from the compressor unit 4 or if the adsorption vessels 6 are overloaded, and is provided for achieving a more rapid and efficient regeneration phase.

As an example and not limiting thereto, the state of overloading can be determined when the dew point at the outlet 3 rises above a predetermined dew point set point, such predetermined dew point set point being for example the desired value at the user's network. Consequently, if the dew point measured at the outlet 3 increases above such dew point set point, the second nozzle 170 can be activated. Similarly, if the dew point measured at the outlet 3 decreases below the dew point set point, the second nozzle 170 can be deactivated.

Accordingly, if the dryer 1 is subjected to such very high flows of compressed gas, the controller unit is preferably allowing the first adsorption vessel 7 of the first pair 6a to be in an adsorption phase and the first adsorption vessel 7 of the second pair 6b to be in a regeneration phase. Whereas, the second adsorption vessel 8 part of the first pair 6a is in a regeneration phase and the second adsorption vessel 8 part of the second pair 6b is in an adsorption phase.

Accordingly, the pressure value within the first adsorption vessel 7 part of the first pair 6a is different than the pressure value within the first adsorption vessel 7 part of the second pair 6b, which would allow a flow of gas through the second nozzle 170, from the first adsorption vessel 7 part of the first pair 6a towards the first adsorption vessel 7 part of the second pair 6b. Such flow of gas increasing the efficiency of the regeneration phase of the first adsorption vessel 7 part of the second pair 6b.

Similarly, the pressure value within the second adsorption vessel 8 part of the first pair 6a is different than the pressure value within the second adsorption vessel 8 part of the second pair 6b, which would allow a low of gas through the second nozzle 170, from the second adsorption vessel 8 part of the second pair 6b towards the second adsorption vessel 8 part of the first pair 6a. Such flow of gas increasing the efficiency of the regeneration phase of the second adsorption vessel 8 part of the first pair 6a.

It should be further understood that the same properties of the second nozzle 170 can be maintained when first adsorption vessel 7 part of the first pair 6a is switched from an adsorption phase into a regeneration phase, said second adsorption vessel 8 part of the first pair 6a is switched from a regeneration phase into an adsorption phase, said first adsorption vessel 7 part of the second pair 6b is switched from a regeneration phase into an adsorption phase and the second adsorption vessel 8 part of the second pair 6b is switched from an adsorption phase into a regeneration phase.

If, on the other hand, the dryer 1 is not subjected to a very high flow of compressed gas and the first adsorption vessel 7 part of the first pair 6a is in the same phase as the first adsorption vessel 7 part of the second pair 6b, either adsorption or regeneration phase, and the second adsorption vessel 8 part of the first pair 6a is in the same phase as the second adsorption vessel 8 part of the second pair 6b, since there would not be any pressure difference between the pressure value within the first adsorption vessel 7 part of the first pair 6a and the first adsorption vessel 7 part of the second pair 6b, or between the pressure value within the second adsorption vessel 8 part of the first pair 6a and the second adsorption vessel 8 part of the second pair 6b, there will be no flow of gas flowing through the respective second nozzle 170.

In another embodiment according to the present invention said second nozzle 170 can be mounted between the outlet flow conduit 10 of the first adsorption vessel 7 of the first pair 6a and the outlet flow conduit 10 of the second adsorption vessel 8 part of the second pair 6b, whereby another second nozzle 170 can be mounted between the outlet flow conduit 10 of the second adsorption vessel 8 part of the first pair 6a and the outlet flow conduit 10 of the first adsorption vessel 7 part of the second pair 6b. It should be understood that the same logic for the flow of gas through the respective second nozzle 170, as explained above applies.

It should be further understood that the dryer 1 can adapt the phases in which the individual adsorption vessels 6 are subjected to, based on the intensity of the flow of compressed gas from the compressor unit 4 and based on whether an additional flow of gas through the additional nozzle 170 is or not needed, said flow of gas being known as a purge flow.

In FIG. 6, another example of a dryer 1 according to the present invention is shown, such dryer 1 comprising four pairs of two adsorption vessels 6: 6a to 6d.

For such an example the controller unit of such dryer 1 can maintain the first pair 6a and the second pair 6b functioning and the third pair 6c and the fourth pair 6d in back-up mode, if the intensity of the flow of compressed gas at the inlet 2 is not high, or it can allow three pairs or even all four pairs 6a to 6d to function, in case the intensity of the flow of compressed gas at the inlet 2 increases.

In one embodiment according to the present invention, said flow reducer 14 is positioned on the inlet flow conduit 9, between the control valve 11 and at least on one of said first and/or second adsorption vessels, 7 or 8.

Preferably, but not limiting to, said flow reducer 14 is provided on the inlet flow conduit 9, between each of said control valves 11 and each of said first and second adsorption vessels 7 and 8.

By positioning the flow reducer 14 on the inlet flow conduit 9 the desiccant material provided in any of the two adsorption vessels 7 and 8 is protected from possible sudden pressure drops when an adsorption vessel 6 is brought in a regeneration phase in which its inlet flow conduit 9 is connected to the outside environment, as well as possible sudden pressure increases when such adsorption vessel 6 is brought in an adsorption phase in which it is connected to the compressor unit 4 or when the volumetric flow provided by the compressor unit 4 suddenly increases.

It should be understood that the nozzle 17 also has an important role in maintaining a small pressure drop between the first and the second adsorption vessels, 7 and 8, since a continuous fluid communication between the two adsorption vessels 7 and 8 is maintained, and therefore a pressure equalization will be attempted at all times between the two adsorption vessels 7 and 8.

In yet another embodiment according to the present invention, the controller unit can further influence the volume of dry gas at the outlet 3 by shifting the moment when one of the adsorption vessels 6 is switched into an equalization phase.

Accordingly, if we take the example of an adsorption dryer comprising three pairs, 6a to 6c, of two adsorption vessels 6, a first adsorption vessel 7 and a second adsorption vessel 8, for each of the three pairs 6a to 6c, the first adsorption vessel 7 being subjected to an adsorption phase, while the second adsorption vessel 8 is being subjected to a regeneration phase.

Typically, the regeneration phase is being performed in a shorter time interval than an adsorption phase, and said equalization phase is performed in a significantly shorter time interval than a regeneration phase.

Preferably, while the first adsorption vessel 7 is in adsorption phase, the second adsorption vessel 8 is subsequently subjected to a regeneration phase and an equalization phase.

Further, in order to increase the flow of dry compressed gas at the outlet 3, the equalization phase of the second adsorption vessel 9 part of the second pair 6b is started when the equalization phase of the second adsorption vessel 8 part of the first pair 6a is finished.

The equalization phase of the second adsorption vessel 8 part of the third pair 6c can be started at the same time as the equalization phase of the second adsorption vessel 8 pa t of the first pair 6a or at the same time as the equalization phase of the second adsorption vessel 8 part of the second pair 6b.

In another embodiment according to the present invention, for an even more increased flow of dry compressed gas at the outlet 3, the equalization phase of the second adsorption vessel 8 part of the third pair 6c can be started when the equalization phase of the second adsorption vessel 8 part of the second pair 6b is finished. As a consequence, all three equalization phases for the three second adsorption vessels 8 of the three pairs 6a to 6c are shifted with respect to one another, which would mean a more efficient drying process and an increased flow of dry compressed gas at the outlet 3.

As an example and not limiting thereto, the adsorption phase can be maintained for a time interval selected between one hundred and three hundred seconds, preferably between one hundred and two hundred seconds, even more preferably said adsorption phase can be maintained for approximately one hundred and twenty seconds.

Typically the equalization phase can be approximately four times shorter than the regeneration phase.

As an example, but not limiting thereto, when said adsorption phase is maintained for approximately one hundred and twenty seconds, said regeneration phase can be performed over a time interval selected between eighty and one hundred seconds, preferably between ninety and one hundred seconds, even more preferably the regeneration phase can be maintained for approximately ninety five seconds, while the equalization phase is maintained for the remaining time interval until the adsorption phase is finished.

In the context of the present invention, it should be understood that other time intervals can be applied depending on the dimensions of the adsorption vessels 6 and the requirements of the dryer 1, without departing from the scope of the invention, and the above examples should not be considered limiting.

It should be further understood that such a logic can be applied to dryers 1 comprising more or less pairs of two or more adsorption vessels 6, such as for example dryers 1 comprising: two, four, five, six or even more pairs of two or more adsorption vessels 6.

In another embodiment according to the present invention, said flow reducer 14 is positioned between said control valves 11 and said depressurization unit 13.

In such a situation it is preferred that the compressor unit 4 is maintained in a relatively stable operation, without sudden flow fluctuations such that the desiccant material comprised within the first and second adsorption vessels 7 and 8 is not affected.

In another embodiment according to the present invention the depressurization unit 13 comprises a silencer (not shown) connected to the atmosphere. Because of such a layout, whenever an adsorption vessel is brought in a regeneration phase the moisture which was previously adsorbed and contained therein, is being efficiently removed to the outside environment and, at the same time, any sound created by the pressure difference between the outside environment and the pressure value within said adsorption vessel 6 will be considerably attenuated. Accordingly, the possible loud sound will be attenuated because of the existence of the flow reducer 14 that will not allow a relatively big pressure drop due to the pressure difference between the outside environment and the pressure value within said adsorption vessel 6. Accordingly, the dryer 1 of the present invention can be used within different locations governed by strict environmental conditions.

Typically any type of silencer 13 can be used for the present invention: a low pressure drop, a normal pressure drop or a high pressure drop silencer 13. It is preferred to use a low pressure drop silencer 13 for protecting the desiccant beads, case in which if we would not have a flow reducer 14, a very loud noise would be created when one of the adsorption vessels 6 would be connected to the atmosphere.

In one embodiment according to the present invention the flow reducer 14 is in the shape of a controllable valve. Such a valve being capable of gradually increasing the pressure within said adsorption vessel 6 until such pressure would reach approximately the same value as the pressure of the outside environment.

Figure 8:
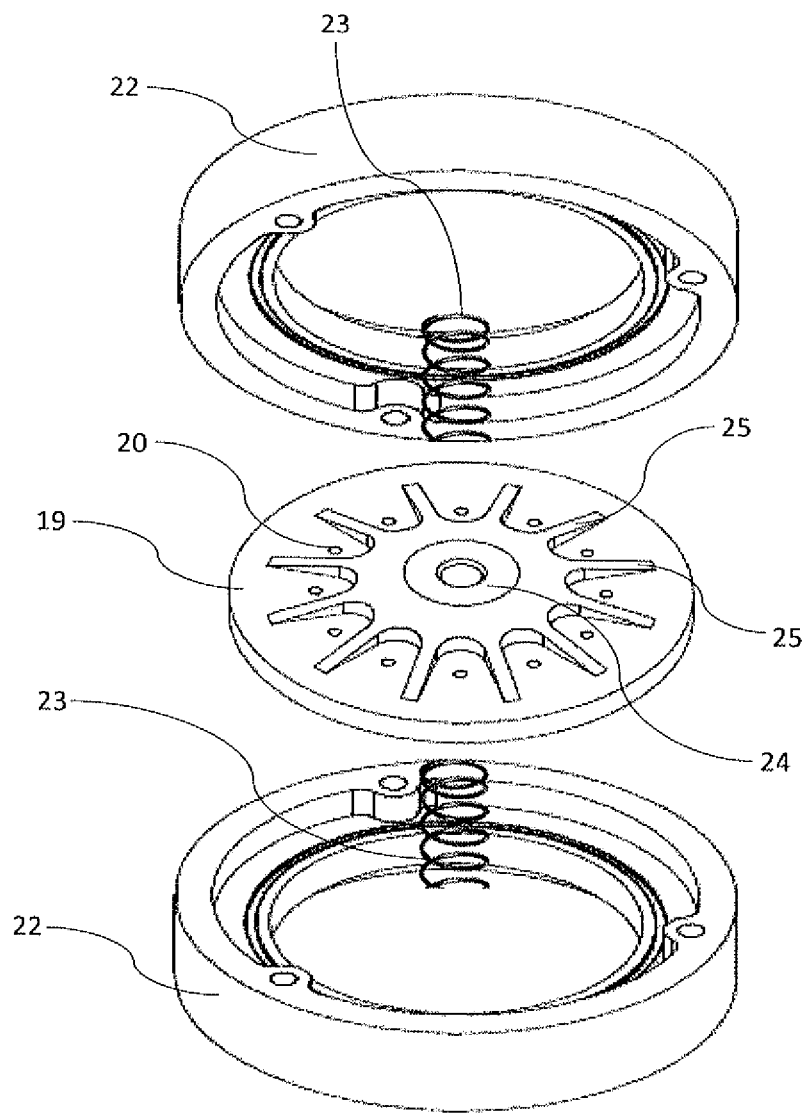
FIG. 8 schematically represents an exploded view of the flow reducer according to an embodiment of the present invention.

In another embodiment of the present invention, said flow reducer 14 comprises a perforated disk 19, as illustrated in FIG. 8.

Such perforated disk 19 allowing a minimum volume of gas therethrough. The perforations 20 are being created in a plurality of possible places on the surface of said perforated disk 19.

Preferably, but not limiting to, said perforations 20 are being created in the vicinity of the exterior contour.

The number and diameter of such perforations 20 can differ depending on the capacity of each adsorption vessel 6. Accordingly, if the adsorption vessel 6 is of a smaller capacity, said perforations 20 can be performed of a smaller diameter, or of a fewer number, than, if said adsorption vessel 6 is of a bigger capacity.

However, the diameter of the perforations 20 are typically not dependent on the pressure achievable within the adsorption vessels 6. Accordingly, the same diameter for the perforations 20 can be used for an adsorption vessel 6 working at a relatively low pressure as well as an adsorption vessel 6 working at a relatively high pressure.

In FIG. 8 the perforated disk 19 has twelve perforations 20, but the present invention should by no means be limited to such a number, and it should be understood that the number of such perforations 20 can vary. It can be any number selected between for example two and twelve, or even higher, a few examples are illustrated in FIGS. 12-17.

Preferably, said perforated disk 19 is slidable on a shaft 21 in between two end caps 22. The perforated disk 19 is slidably moving on said shaft 21 in accordance with the pressure difference measured on the flow conduits before and after said perforated disk 19.

Accordingly, if the flow reducer 14 is positioned on the inlet flow conduit 9, between the control valve 11 and at least on one of said first and/or second adsorption vessels 7 and 8, the perforated disk 19 is slidably moving on said shaft in accordance with the pressure difference between the pressure value in the inlet flow conduit 9 between the control valve 11 and the flow reducer 14 and the pressure value in the inlet flow conduit 9 between the flow reducer 14 and the adsorption vessel 6.

If said flow reducer 14 is positioned between one or both said control valves 11 and said depressurization unit 13, the perforated disk 19 is slidably moving on said shaft in accordance with the pressure difference between the pressure value in the inlet flow conduit 9 between the control valve 11 and the flow reducer 14 and the pressure value between the flow reducer 14 and the depressurization unit 13.

When the flow reducer 14 is positioned between one or both said control valves 11 and said depressurization unit 13, the flow reducer 14 is reducing the flow of fluid only when one of the adsorption vessels 6 is brought in fluid communication with the depressurization unit 13, and not when one of the adsorption vessels 6 is in adsorption phase or during pressurization phase, said pressurization phase taking place when one adsorption vessel 7 is maintained in fluid communication with the other adsorption vessel 8 through nozzle 17, until the pressure in the adsorption vessel 7 reaches the value of the pressure in the adsorption vessel 8. Typically, after the pressurization phase said adsorption vessel 7 is subjected to an adsorption cycle and the other adsorption vessel 8 is subjected to a regeneration cycle.

In such a case it is preferred that the depressurization unit 13 comprises a silencer with a low pressure drop.

In a preferred embodiment, for a better stability of the perforated disk 19, the perforations 20 are positioned on the surface of the perforated disk 19 such that the distance between the center of said perforated disk 19 and each of the perforations 20 is equal. Further, the circular arc created between any two perforations 20 is also preferably equal.

In another embodiment according to the present invention, the perforations 20 are preferably equally and/or symmetrically disposed on the surface of the perforated disk 19.

In yet another embodiment according to the present invention, said perforations 20 can be in the shape of slits positioned on the outer contour of said perforated disk 19.

It should be understood that the present invention is not limited to any particular shape or number of the perforations 20, as long as the effect of the flow reducer 14 is obtained.

In a preferred embodiment according to the present invention, and not limiting to, said shaft 21 is positioned through the center of said perforated disk 19. By choosing such a layout, the design of the flow reducer is maintained very simple, with low manufacturing costs.

The present invention should not be limited to the layout of the flow reducer illustrated in the drawings and defined therein. Such flow reducer can comprise more than one shaft, such as two, three or four shafts, as well as no shafts at all, situation in which the movement of the perforated disk is guided by the space delimited by the two end caps 22 and possibly the lateral walls.

In another preferred embodiment according to the present invention and as illustrated in FIG. 8, said flow reducer 14 comprises two springs 23 positioned in between the perforated disk 19 and each of the two end caps 22. By including said two springs 23, the pressure difference at which the perforated disk 19 moves towards one end cap 22 or the other can be better controlled. Accordingly the perforated disk 19 will have to move against the force generated by one of said springs 23 until a direct contact with one of the two end caps 22 is realized, moment when the fluid is flowing only through the perforations 20, as shown in FIG. 7a and FIG. 7c.

Preferably, the rod 21 goes through the center of the two springs 23 and further comprises at each of its two ends a rim type of structure, being in direct contact with and stopping the two springs 23.

Preferably, the rim type of structure from the end of the rod 21 opposite from the adsorption vessel 6 or from the depressurization unit 13, depending on where said flow reducer is mounted, is fixed within a manifold comprising a flow conduit allowing fluid to reach the flow reducer 14. Because the rod 21 is mounted only on one side, the mounting procedure and the maintenance procedure become much easier.

Figure 7:
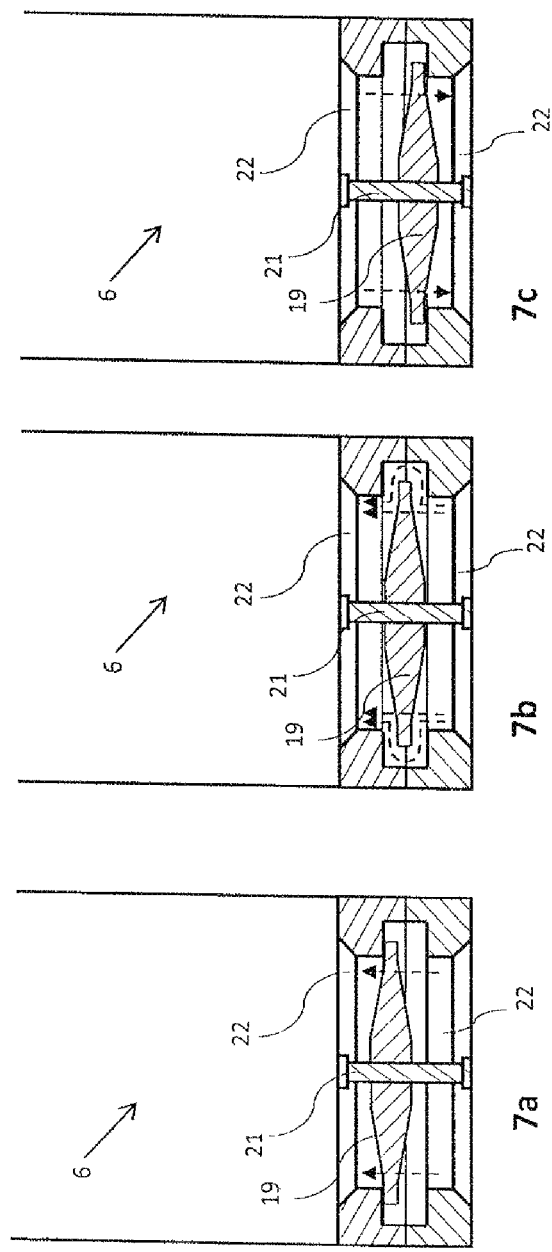
FIG. 7 schematically represents the different possible positions of the perforated disk according to an embodiment of the present invention and the flow of fluid through the flow reducer.

If the perforated disk 19 is maintained between the two end caps 22, a flow of fluid is preferably allowed through the perforations 20 as well as between the outer circumference of the perforated disk 19 and the walls delimited by the two end caps 22, as illustrated in FIG. 7b.

Because the two springs 23 are positioned between the perforated disk 19 and each of the end caps 22, a better stability of the flow reducer 14 is achieved.

In another embodiment according to the present invention, for a stronger layout, the flow reducer 14 can further comprise two bushings or bearings 24 positioned in between the perforated disk 19 and each of the two springs 23. Said bushings or bearings 24 not allowing the perforated disk 19 to wear in the middle part, due to the friction with the rod 21.

Figure 9:
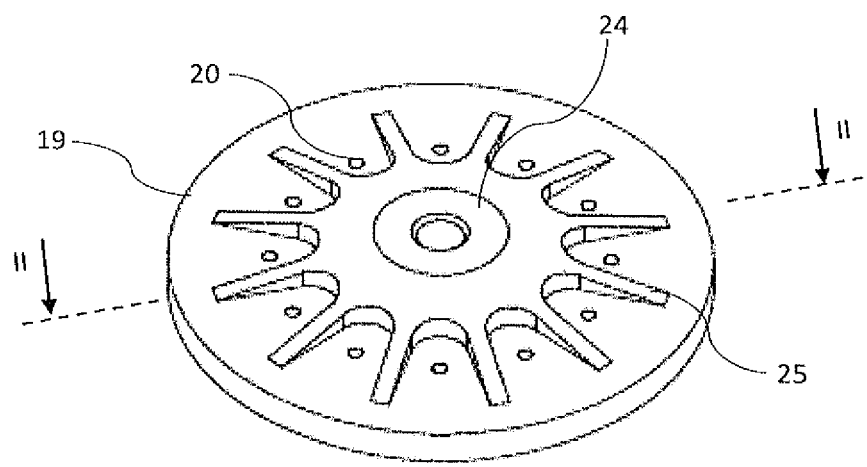
FIG. 9 schematically represents the perforated disk according to an embodiment of the present invention
Figure 10:
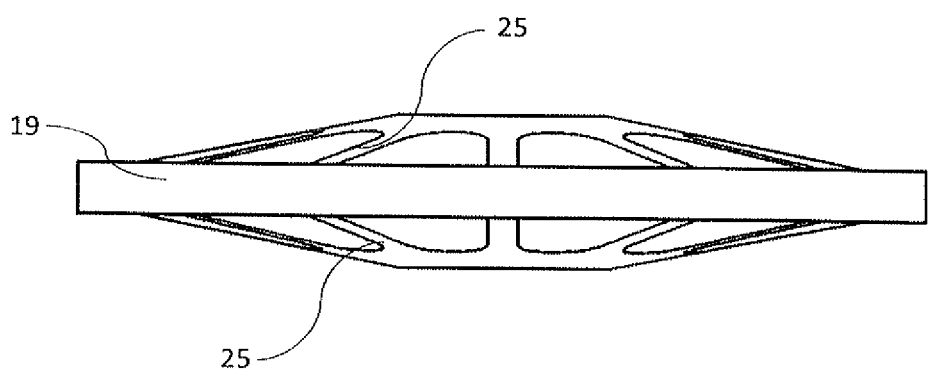
FIG. 10 is a view according to lines II-II of the perforated disk of FIG. 9.
Figure 18:
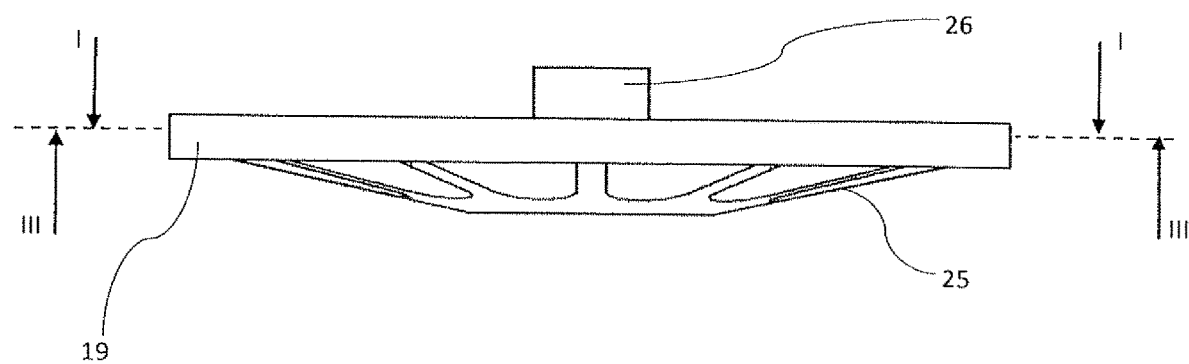
FIGS. 18 and 19 schematically illustrate a perforated disk according to another embodiment of the present invention.
Figure 19:
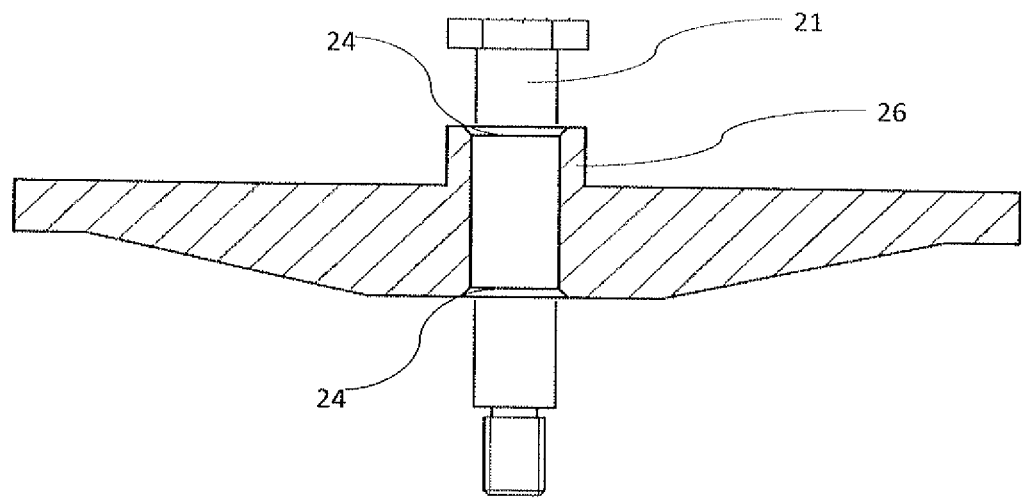
Figure 20:
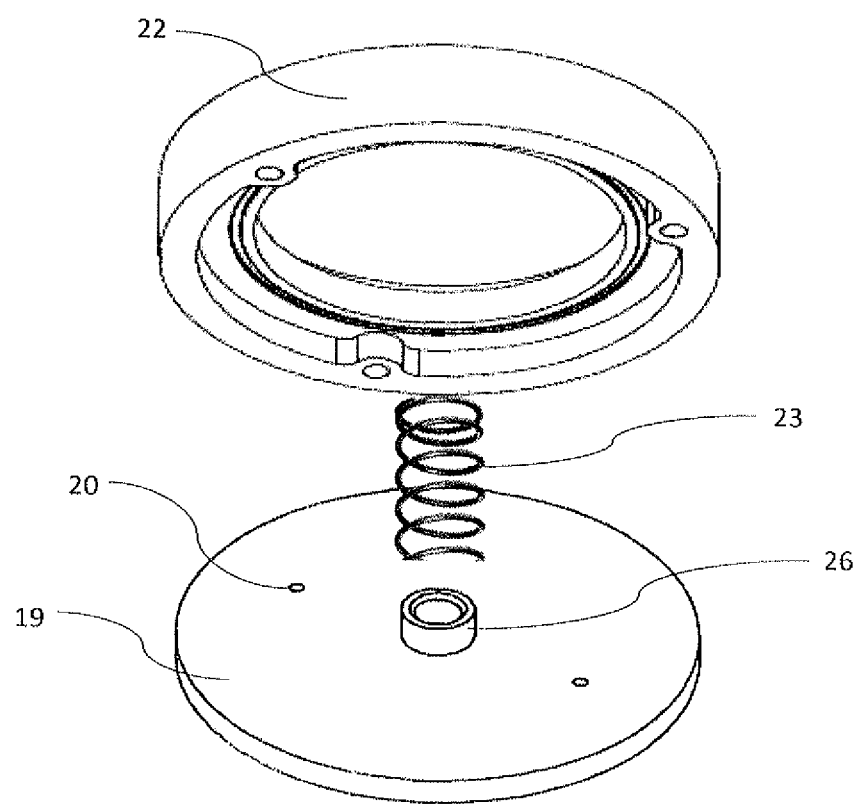
FIG. 20 schematically represents an exploded view of the flow reducer according to an embodiment of the present invention.
Figure 21:
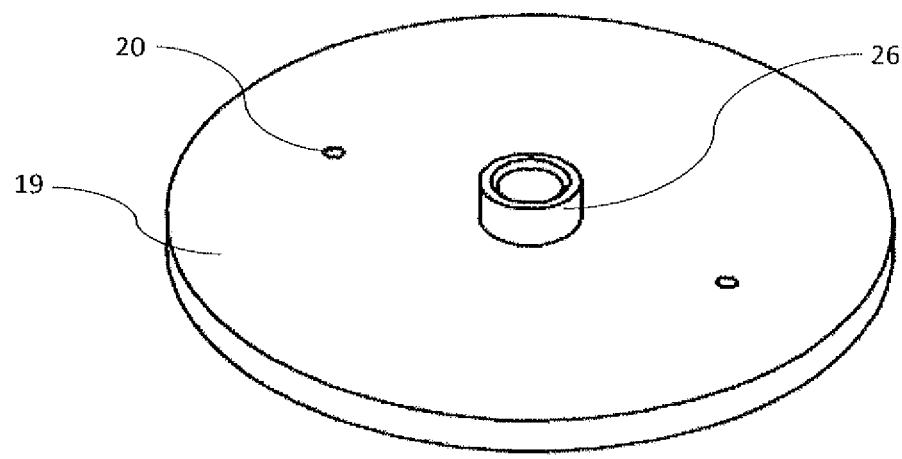
FIG. 21 is a view according to lines I-I of the perforated disk of FIG. 18.
Figure 22:
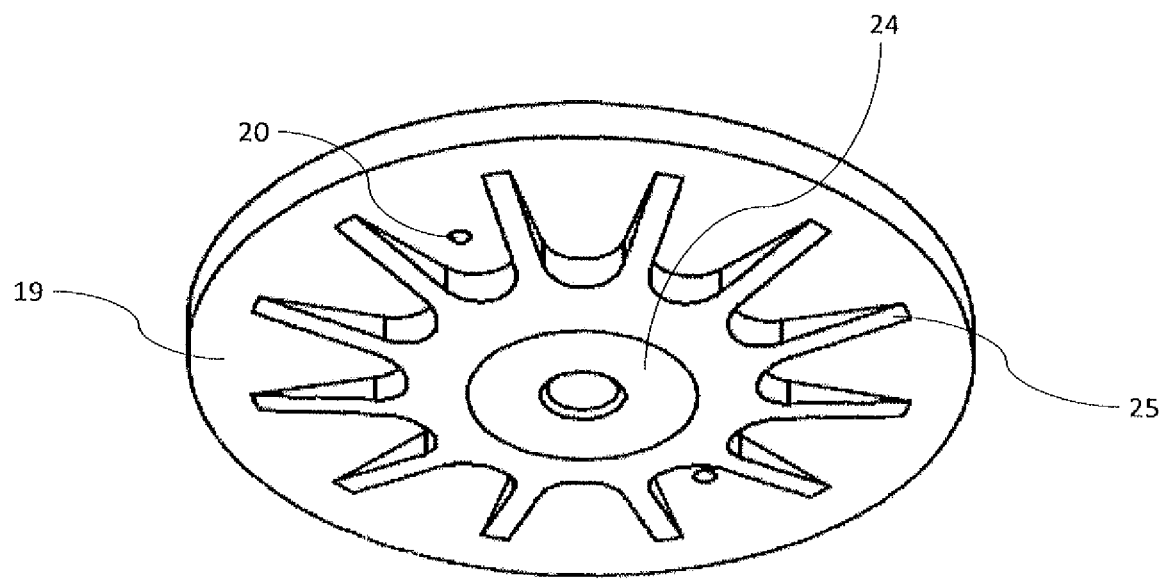
FIG. 22 is a view according to lines of the perforated disk of FIG. 18.

In another embodiment according to the present invention, but not limiting to, said flow reducer 14 further comprises an arm structure 25 created in between each two perforations 20, said arm structure 25 creating a slope gradually increasing in height between the outer circumference of the perforated disk 19 and an elevated central area, as shown for example in FIG. 9, FIG. 10, and FIG. 18.

Such arm structure 25 providing a better mechanical strength to the flow reducer 14.

Figure 11:
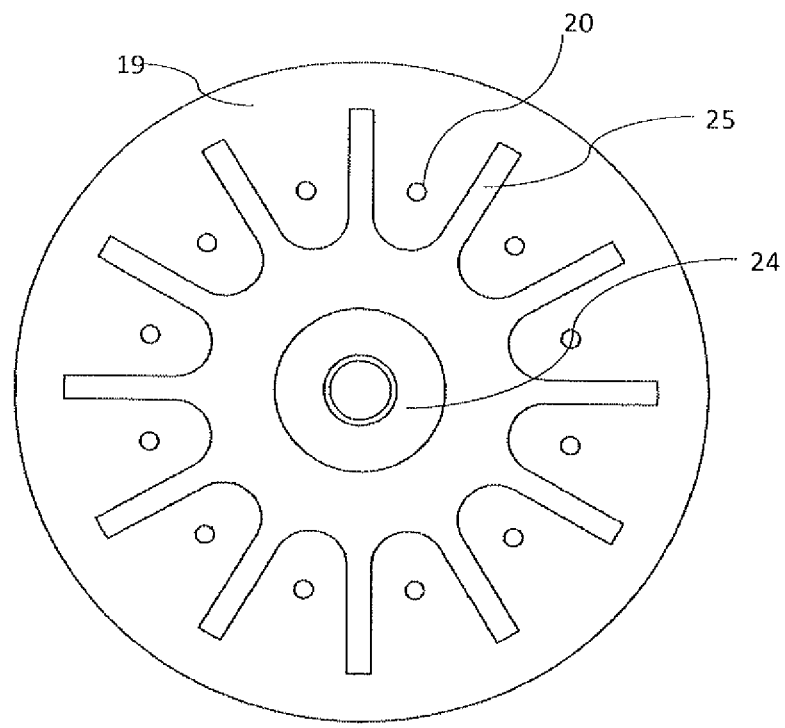
FIG. 11 is a top view of the perforated disk of FIG. 9.
Figure 12:
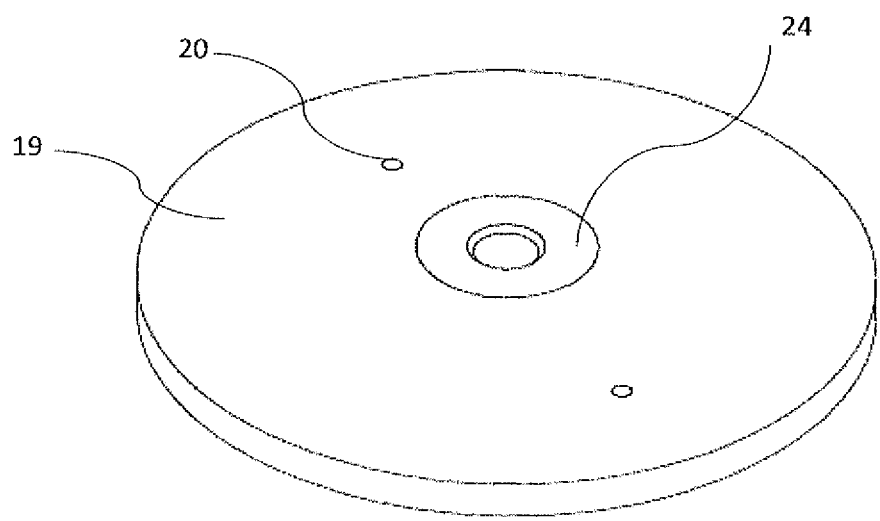
FIGS. 12 to 17 schematically illustrate different layouts of the perforated disk according to another embodiment of the present invention.
Figure 13:
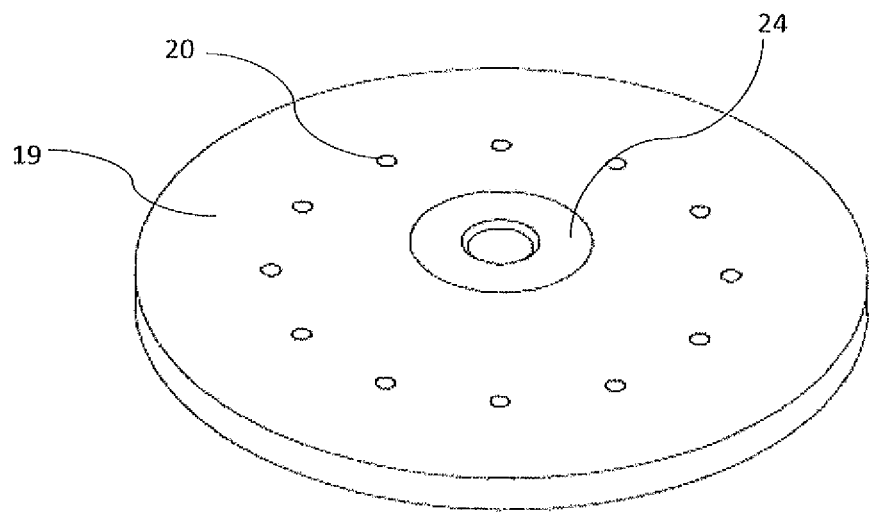
Figure 14:
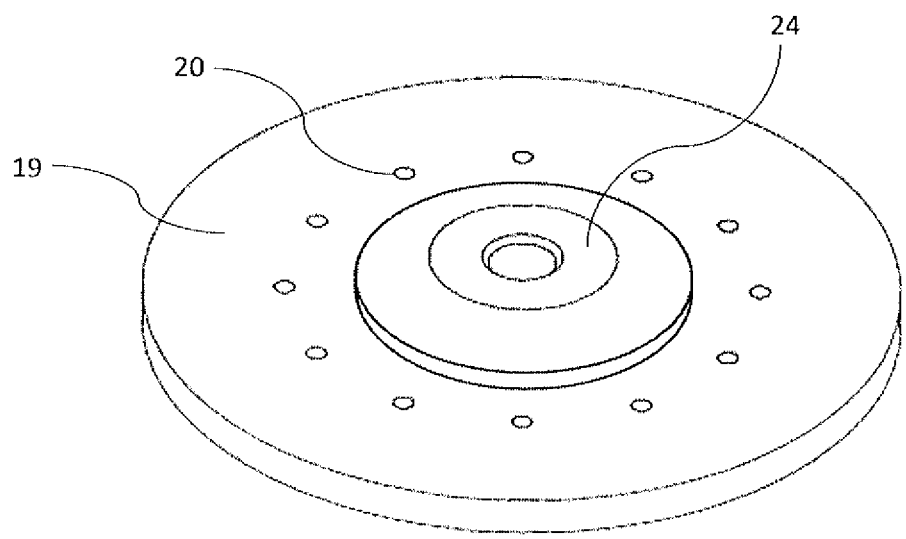
Figure 15:
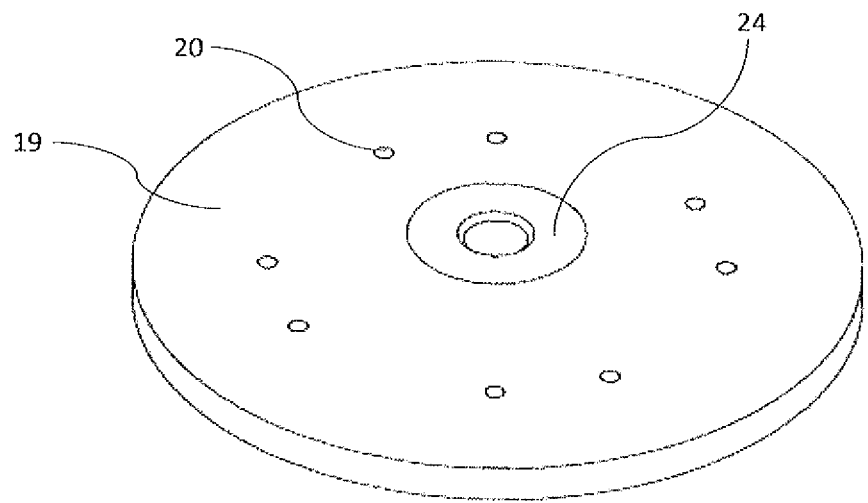
Figure 16:
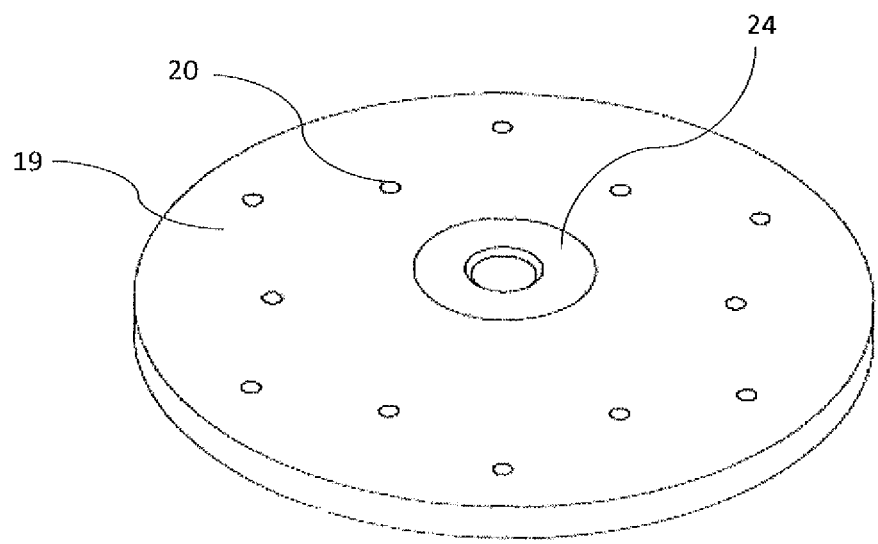
Figure 17:
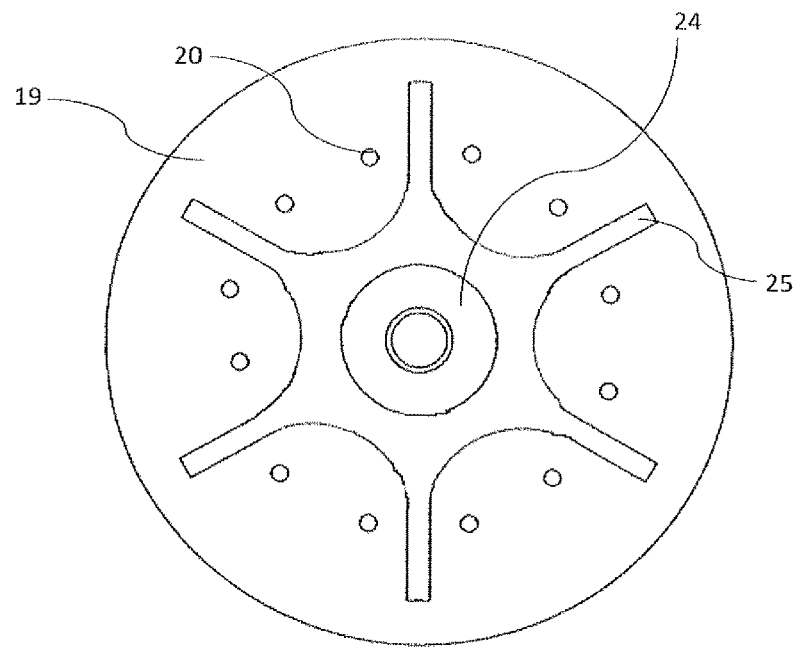

In another embodiment according to the present invention, said arm structure 25 can be realized only in between some of the perforations 20, as shown in FIGS. 11 and 17, such that only a number of arms are created, such number being selected as any number between two and a twelve or even higher.

It is also possible that said arm structure 25 is a continuous structure, creating a slope and gradually increasing in height between a minimum height in the vicinity of the outer circumference of the perforated disk 19 and a maximum height creating an elevated central area, and that the perforations 20 are provided between said outer circumference and the point where the arm structure 25 starts.

In another preferred embodiment, but not limiting to, said arm structure 25 is present on both sides of the perforated disk 19, between the perforated disk 19 and each of the two end caps 22. Accordingly, a symmetry for both sides of the perforated disk 19 is realized.

Depending on the capacity of the adsorption vessels 6 and on the characteristics of the volumetric flow flowing through the inlet flow conduit 9, the perforated disk can be realized of different thicknesses, such as for example, it can have a thickness between 5 millimeters and 20 millimeters, more preferably between 6 millimeters and 18 millimeters.

Even more preferably, if said perforated disk 19 comprises an arm structure 25, said perforated disk 19 is realized of approximately 6 millimeters thick in the vicinity of the outer circumference and therefore in the area with the smallest thickness, and can reach a thickness of approximately 18 millimeters in the vicinity of the elevated central area, said measurement including the elevated central area on both sides.

In another embodiment, but not limiting to, the perforated disk 19 can comprise an arm structure 25 only on one side of the perforated disk 19, as illustrated in FIGS. 18 to 22.

Figure 23:
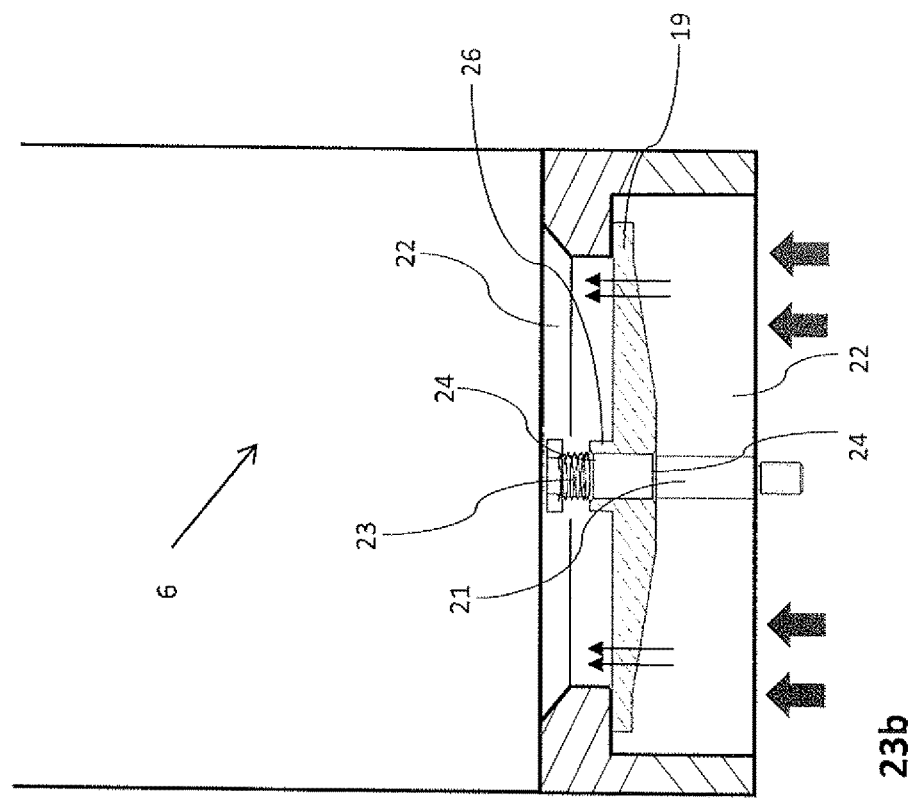
FIG. 23 schematically represents the different possible positions of the perforated disk according to an embodiment of the present invention and the flow of fluid through the flow reducer.
Figure 23:
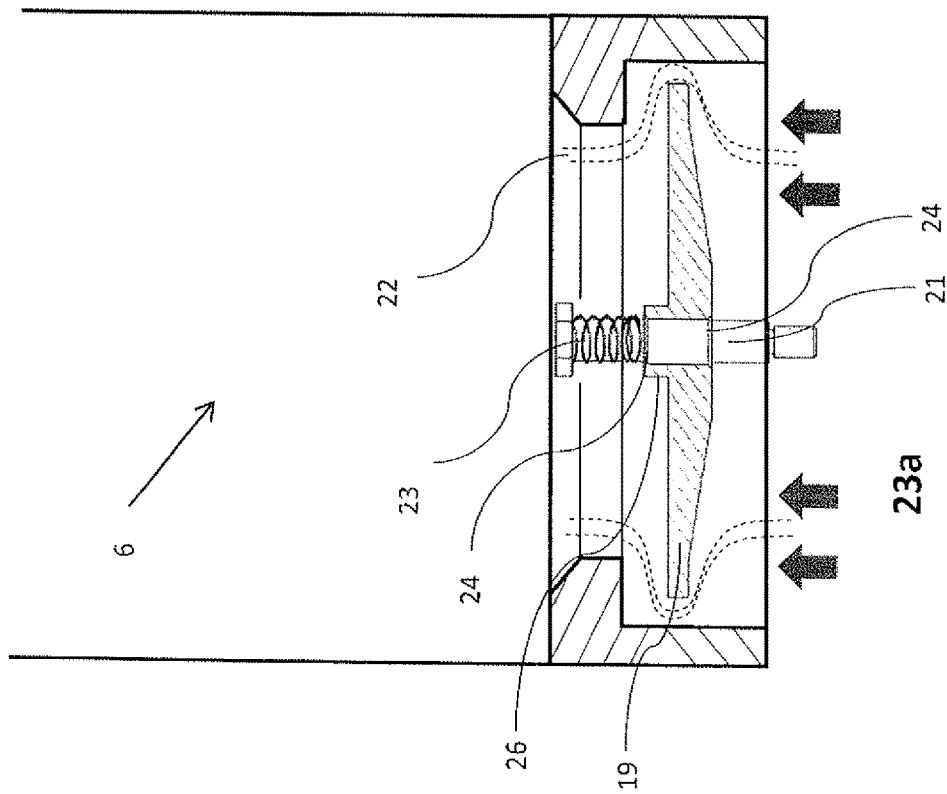

For such a case, when the vessel 6 is in adsorbing phase, fluid is flowing through the perforations 20 present on the perforated disk 19 and through the space delimited by the perforated disk 19 and the external wall of the end cap 22, as illustrated in FIG. 23a.

When the adsorption dryer 1 is maintaining one adsorption vessel 7 connected through nozzle 17 with the other adsorption vessel 8 for pressurizing, the perforated disk has the position as illustrated in FIG. 23b. Accordingly, the perforated disk 19 is pushed against the force of the spring 23 until being in direct contact with the end cap 22, and fluid is flowing only through the perforations 20.

The spring 23 is preferably mounted on the rod 21, between an elevated collar type of structure 26 positioned on the surface of the perforated disk 19, on the face opposite than the one comprising the arm structure 25, and the end of the rod 21, at the level of the end cap 22, preferably comprising a rim structure for stopping said spring 23. Two bushings or bearings 24 are preferably mounted on each side of the perforated disk 19 within carvings, such that wear of said perforated disk 19 due to the friction with the rod 21 is avoided.

The rod 21 further comprises an additional structure on the end opposite from the end cap 22 (not shown) for stopping the perforated disk 19 from leaving the rod 21.

Preferably, the end opposite from the end cap 22 is fixed within a manifold (not shown) through which fluid is flowing. Said fixing can be performed through any type of connection, such as, for example and not limiting to: screw or snap-fit type of connection, it can also be performed through gluing or welding, or said end can be integral part of said manifold. In the context of the present invention it should be understood that the above mentioned types of connection can be implemented to all the different embodiments presented therein.

This type of structure for the perforated disk 19 is limiting the flow of fluid only during the adsorption and pressurizing phase. For such an embodiment it is preferred that the depressurization unit 13 comprises a silencer having a normal pressure drop such that the desiccant beads comprised within said adsorption vessel 6 are further protected when the adsorption vessel 6 is brought in fluid communication with said depressurization unit 13.

In another embodiment according to the present invention, the flow reducer 14 can comprise two perforated end structures 27 sliding on a rod 21 comprising a central shuttle block 28, as illustrated in FIGS. 24 to 27.

Said perforated end structures 27 comprising an outer ring 29 connected to a central block 30 through connections 31.

Preferably, said central block 30 receives in a sliding manner the rod 21, and said connections 31 are made such that the mechanical structure of the perforated end structures 27 can withstand the sliding movement to which it will be subjected and the different pressures the flow reducer 14 is subjected to.

Said connections 31 can be of any number selected for example between one and six or any other number.

Figure 24:
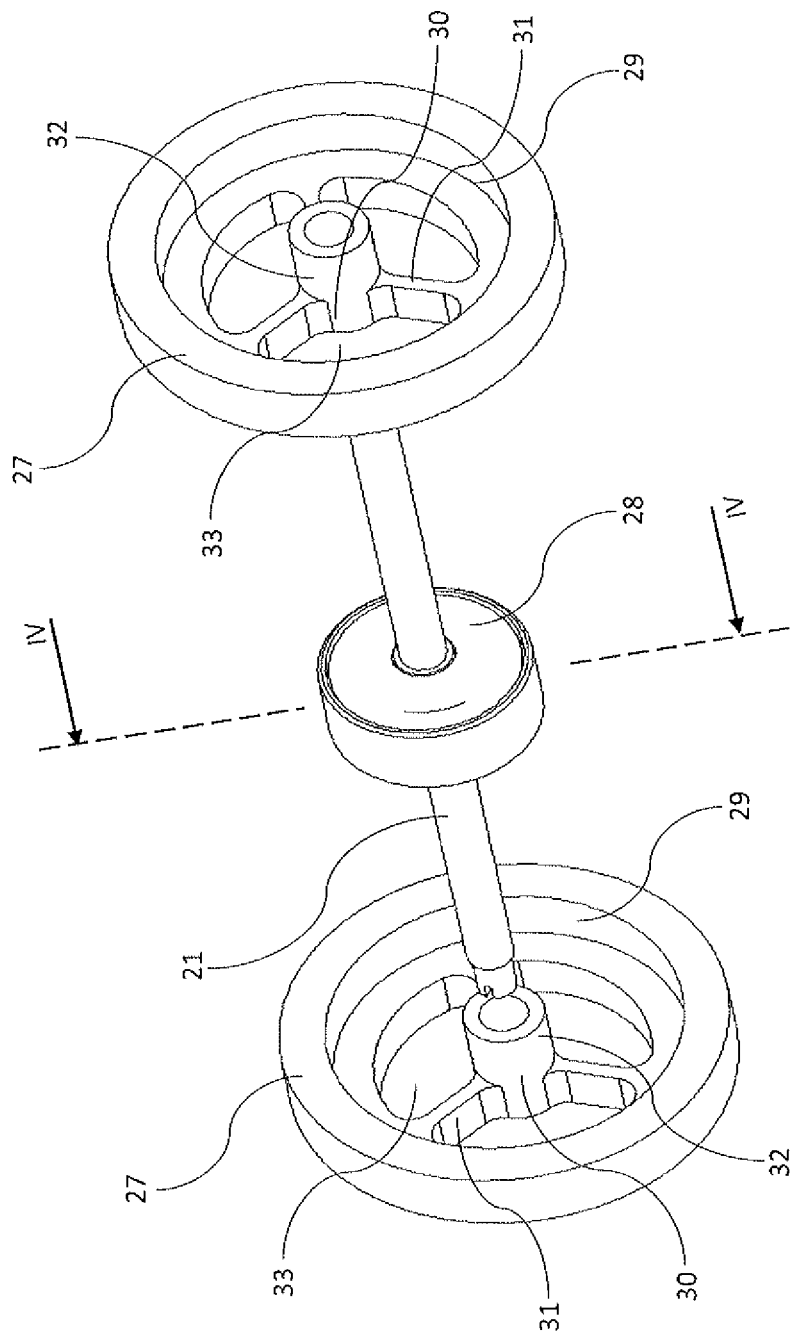
FIG. 24 schematically represents a flow reducer according to another embodiment of the present invention.

For a better stability of the perforated end structure 27, the central block 30 can comprise a more elongated area 32, receiving the rod 21 on a bigger area, as illustrated in FIG. 24.

Preferably, said perforated end structures 27 each comprise a number of perforations 33, allowing fluid to flow therethrough. Said number of perforations can vary from one to for example five or even more, more preferably, said perforated end structures 27 each comprise a number of three perforations.

It should be understood that the present invention should not be limited to the number or shape of the perforations and/or of the connections 31, and that any other number and/or shape can be chosen, achieving the same effect and not departing from the scope of the present invention.

Accordingly, it is also possible for the perforated end structure 27 to comprise an outer ring 29 with a relatively bigger single perforation 33 in the middle, case in which the rod 21 is preferably slidably mounted thought said outer ring 29. It is also possible for flow reducer 14 to comprise more than one rod 21 (not shown).

Preferably said elongated area 32 is stopping the shuttle block 28 at a minimum distance before the perforated end structure 27 such that a minimum flow of fluid is allowed through the perforations and on the exterior surface of the shuttle block 28, as illustrated in FIG. 27b.

When the shuttle block is moved towards the top perforated structure 27, as illustrated in FIG. 27a, the fluid is allowed to flow only through the perforations 33.

Figure 25:
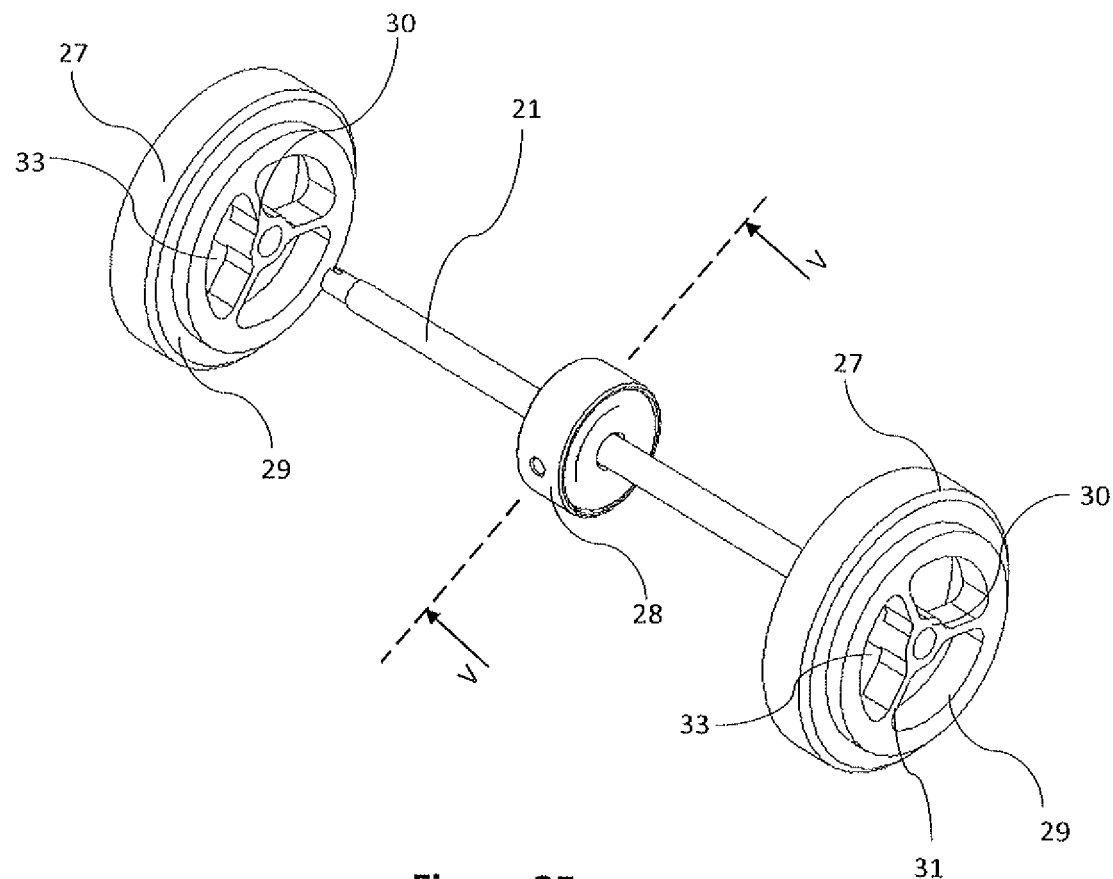
FIG. 25 schematically represents a flow reducer according to yet another embodiment of the present invention.

However, the flow reducer 14 of the present invention can as well function without such an elongated area 32, as illustrated in FIG. 25.

Said flow reducer 14 preferably further comprises a spring 23 allowing the shuttle block 28 to be controllably moved between the two perforated end structures 27, depending on the pressure difference between the pressure measured on the fluid conduit before the flow reducer 14, between the control valve 11 and the flow reducer 14, and the pressure measured on the fluid conduit after the flow reducer 14, between the flow reducer 14 and the depressurization unit 13.

Figure 27:
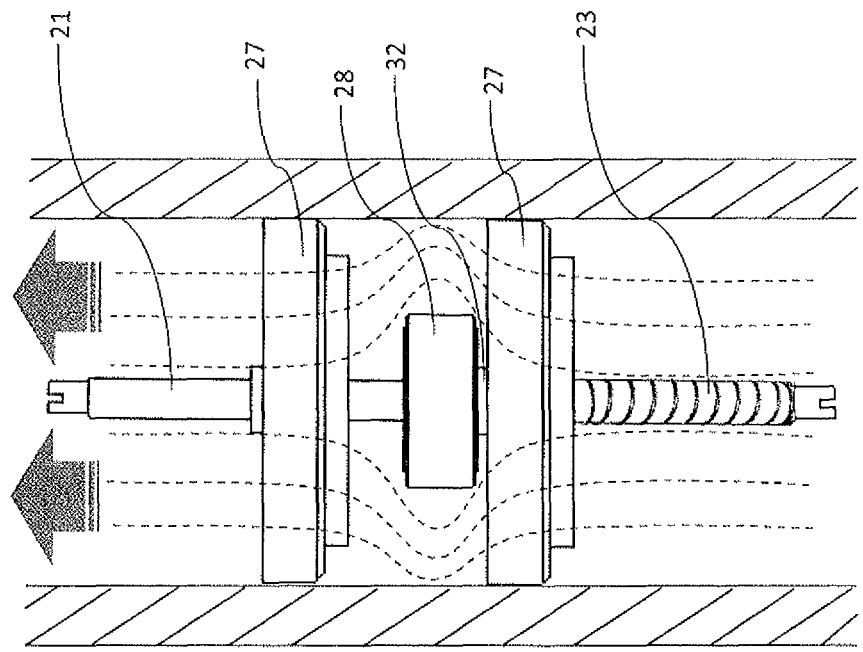
FIG. 27 schematically represents the different possible positions of the perforated disk according to an embodiment of the present invention and the flow of fluid through the flow reducer; and, FIG. 28 schematically represents an example of socket for the flow reducer according to FIGS. 24 to 27.
Figure 27:
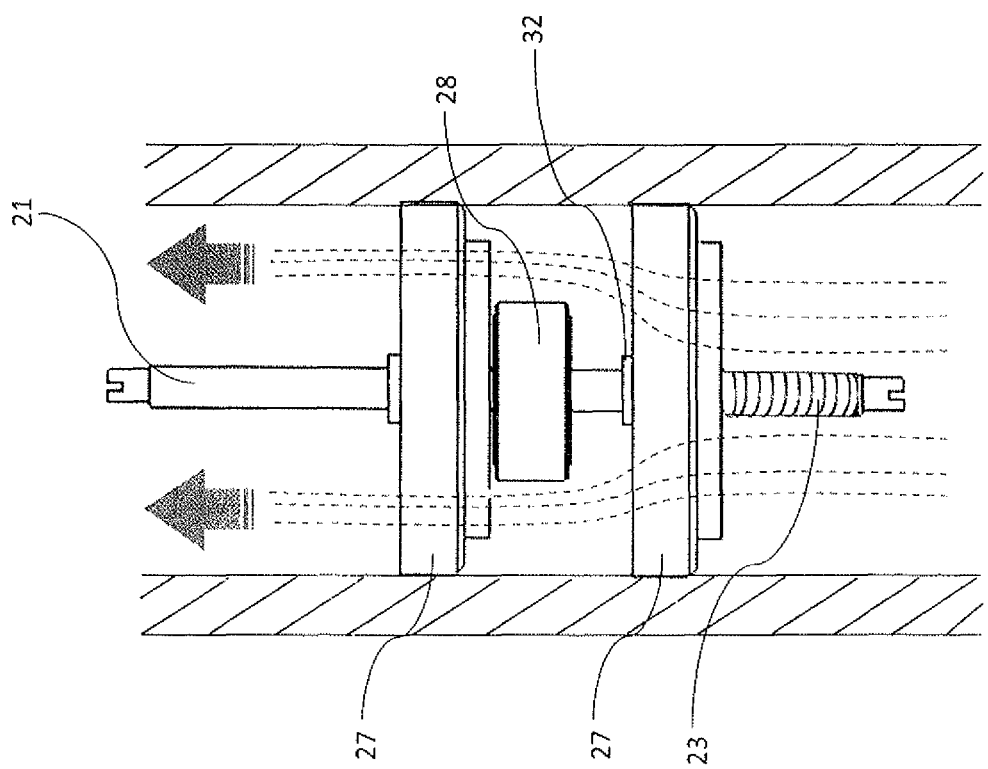

In the context of the present invention, it should be understood that said spring 23 can be positioned on either of the two ends of the rod 21, achieving the same effect, and the embodiment shown in FIG. 27 should not be considered limiting.

Figure 26:
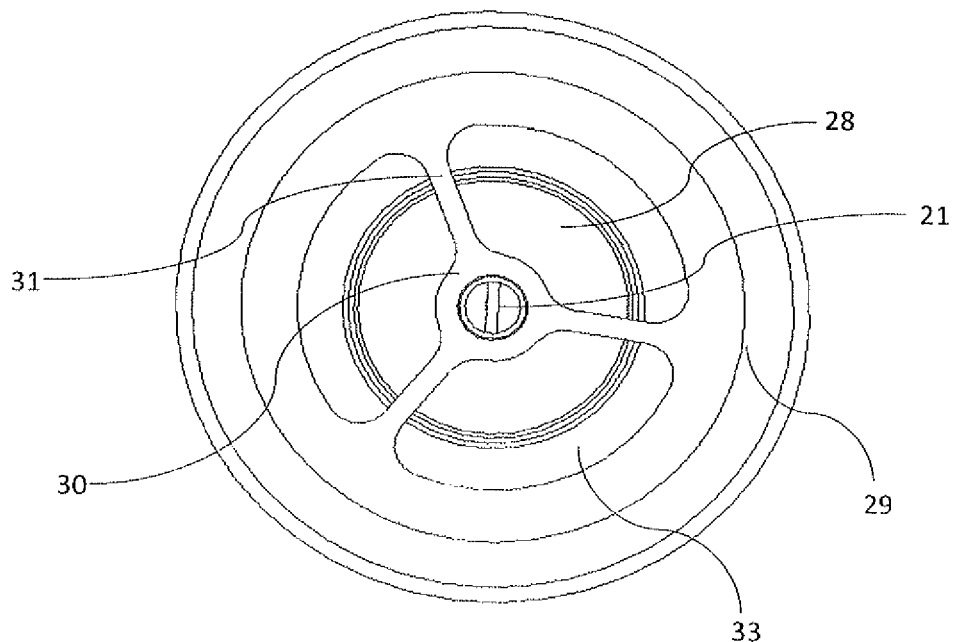
FIG. 26 is a view according to lines IV-IV of FIG. 24 or according to lines V-V of FIG. 25.

The flow reducer 14 as shown in FIGS. 24 to 26 can be used when such flow reducer 14 is mounted between the control valve 11 and the inlet 9 of an adsorption vessel 6 or when such a flow reducer 14 is mounted between the control valve 11 and the depressurization unit 13.

When such a flow reducer is mounted between the control valve 11 and the inlet 9 of the adsorption vessel 6, the diameter of perforated end structures 27 and accordingly of the entire flow reducer 14 is adapted to match the diameter of the adsorption vessel 6.

When the flow reducer is mounted between the control valve 11 and the depressurization unit 13, the diameter of the perforated end structures 27 and accordingly of the entire flow reducer 14 is adapted to match the diameter of the flow conduit entering the depressurization unit.

Preferably, but not limiting to, the shuttle block 28 is mounted in a fixed manner on the rod 21, as illustrated in FIG. 27, and preferably the structure comprising the rod and said shuttle block 28 is moving between the two perforated end structures 27, under the force of the spring 23.

Figure 28:
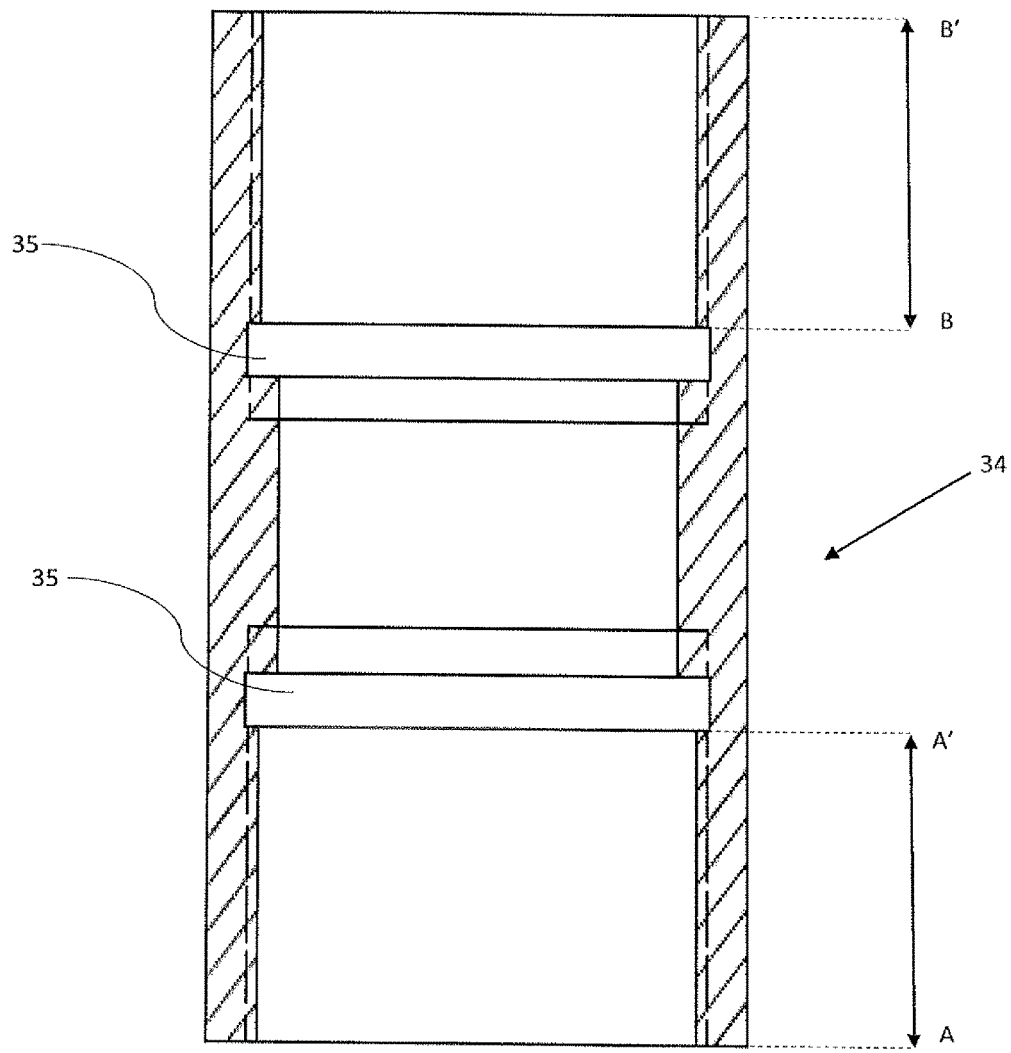

The flow reducer as illustrated in FIGS. 24 to 27 can be mounted within a socket 34 as illustrated in FIG. 28, said, socket preferably comprising areas AA' and BB' having a thread area on the circumference of the lateral walls. Such areas AA' and BB' receiving the perforated end structures 27.

Further preferably, the perforated end structures 27 comprise a thread on the exterior surface such that they can be each threaded into areas AA' and BB', respectively.

The socket further comprises an unthreaded zone 35 for stopping the perforated end structures 27.

The area defined between AA' and BB' preferably defines the stroke of the shuttle block 28.

In the context of the present invention it should be understood that the socket 34 can be realized in a different manner as well, and the present invention should not be limited to such a layout.

In another embodiment according to the present invention, the perforated end structures 27 can be selected to have approximately the same layout as the perforated disk illustrated in FIGS. 11 to 17. However, in such a case it is preferred that the perforations 20 are created of a relatively bigger diameter. If such perforations 20 are created of a relatively small diameter, the time frame in which the adsorption vessel 6 is relieved of the pressure built up therein is longer. Accordingly, if the speed of the fluid flowing therethrough is increasing, such perforations will create a bigger restriction. Whereas, if said perforations 20 are created of a relatively bigger diameter, the time frame in which the adsorption vessel 6 is relieved of the pressure build therein is shorter.

In yet another embodiment, the perforated disk 19 can be provided with carvings in which the bushings or bearings 24 are received, such that the height of the bushings or bearings 24 once mounted, does not exceed the height of the elevated central area.

Preferably, the dryer 1 comprises a control unit (not shown) for actuating said two control valves 11 and said solenoid valve 16.

The functioning principle is very simple and as follows.

The first adsorption vessel 7 part of the dryer 1 is brought in an adsorption phase in which the outlet of a compressor unit 4 is brought in fluid communication with the inlet flow conduit 9 of said first adsorption vessel 7 through a first control valve 11 connected on said inlet flow conduit 9, said first control valve 11 being in a first state. Consequently, the flow of compressed gas flows through said inlet flow conduit 9, through the desiccant material comprised therein and out of said first adsorption vessel 7, through the outlet flow conduit 10. Said desiccant material adsorbing moisture possibly contained within the flow of compressed gas.

At the same time, the second adsorption vessel 8, which is connected in parallel with said first adsorption vessel 7 is, brought in a regenerations phase in which the inlet flow conduit 9 is brought in fluid connection with a depressurization unit 13 through a second control valve 11, said second control valve 11 being connected on the inlet flow conduit 9 of said second adsorption vessel 8 and being in a second state.

Preferably, for an increased efficiency of the regeneration phase, a minimum flow of dry gas is allowed to flow from an outlet flow conduit 10 of the first adsorption vessel 7 through an outlet flow conduit 10 of the second adsorption vessel 8.

The dryer 1 is preferably adapting the pressure drop within the adsorption vessel 6 subjected to a regeneration phase, in this case said second adsorption vessel 8, by controlling the speed of the fluid exiting the second adsorption vessel 8 by means of a flow reducer 14 connectable to the inlet flow conduit 9 of said second adsorption vessel 8.

After the second adsorption vessel 8 has been regenerated, the dryer 1 preferably subjects said second adsorption vessel 8 to an adsorption phase by bringing the outlet of the compressor unit 4 in fluid communication with the inlet flow conduit 9 of said second adsorption vessel 8 through said first control valve 11, said first control valve 11 being brought in a first state. The dryer 1 further subjects the first adsorption vessel 7 to a regeneration phase by bringing its inlet flow conduit 9 in fluid connection with said depressurization unit 13 through said second control valve 11, which is being brought in a second state.

In the context of the present invention it should be understood that the adsorption phase and regeneration phase are being switched in a cyclic manner for each of the first and second adsorption vessels 7 and 8.

It should be further understood that the vessels can also be rotated upside down, such that the inlet flow conduit 9 becomes the previous outlet flow conduit 10 and the outlet flow conduit 10 becomes the previous inlet flow conduit 9. However, the direction of the flow of gas during the adsorption and the regeneration phase remains the same, such that during adsorption, the compressed gas flows from the bottom of the adsorption vessel 6 towards the top of said adsorption vessel 6, such that moisture is absorbed by the desiccant material provided therein, and during the regeneration phase, the flow of gas flows from the top of the adsorption vessel 6 towards the bottom of said adsorption vessel 6, such that the moisture is eliminated from said adsorption vessel 6 under the action of said flow of gas.

Preferably, said minimum flow of dry gas is allowed to flow from an outlet flow conduit 10 of the first adsorption vessel 7 through an outlet flow conduit 10 of the second adsorption vessel 8 through a nozzle 17 positioned on a flow conduit 18. The rest of the flow of dry gas is flowing through an outlet 3 of the dryer 1 to the user 5 of dry compressed gas.

Accordingly, the first and second adsorption vessels, 7 and 8, create two flow paths between the inlet 2 and the outlet 3 of the dryer 1: a first flow path in which the flow of compressed gas is flowing through the inlet 2 of the dryer 1, through the control valve 11 and the inlet flow conduit 9 of the first adsorption vessel 7, and further through the outlet flow conduit 10 of said first adsorption vessel 7 and through the outlet 3 of the dryer 1, with a minimum flow of gas flowing through the nozzle and further through the second adsorption vessel 8. Whereas for the second flow path, the flow of compressed gas is flowing through the inlet 2 of the dryer 1, through the control valve 11 and the inlet flow conduit 9 of the second adsorption vessel 8, and further through the outlet flow conduit 10 of said second adsorption vessel 8 and through the outlet 3 of the dryer 1, with a minimum flow of gas flowing through the nozzle 17 and further through the first adsorption vessel 7.

Preferably, the size of the nozzle 17 is depending on the working pressure typically achieved within the adsorption vessels 6. Accordingly, if the pressure achieved within the adsorption vessels 6 is high, the diameter of the nozzle 17 should be chosen relatively small, and if the pressure achieved within the adsorption vessels 6 is relatively low, the diameter of the nozzle 17 should be chosen relatively big in order to achieve roughly the same regeneration flow between the adsorption vessels 6.

As an example and not limiting to, the diameter of the nozzle can vary between approximately 1 millimeter and approximately 6 millimeters, or between approximately 1.5 millimeters and approximately 5.3 millimeters. It should be understood that other diameters are also possible, and the present invention should not be limited to such values.

Further, the diameter of said nozzle 17 is influencing the time frame in which the equalization of the pressure between two adsorption vessels 7 and 8 takes place. Typically an adsorption vessel 7 is maintained in an adsorption phase during the time frame in which the other adsorption vessel 8 is maintained in regeneration phase and during the time frame in which said adsorption vessel 8 is brought at the same pressure value as the adsorption vessel 7.

In one embodiment according to the present invention the flow reducer 14 is controlling the volume of fluid flowing therethrough by means of a controllable valve (not shown). Such a controllable valve being preferably continuously controlled such that the pressure drop within one of the two adsorption vessels 7 or 8 is continuously adapted.

In a preferred embodiment according to the present invention, the flow reducer 14 is controlling the volume of fluid flowing therethrough by means of a perforated disk 19.

Preferably, the dryer 1 is maintaining the fluid communication between the outlet of the compressor unit 4 and the inlet flow conduit 9 of the first adsorption vessel 7 and the fluid communication between the inlet flow conduit 9 of the second adsorption vessel 8 and the depressurization unit 13 for a predetermined time interval. Said predetermined time interval being preferably a minimum time interval in which the desiccant material provided within said second adsorption vessel 8 is completely regenerated.

In a preferred embodiment, the desiccant material is regenerated by mean of cold compressed gas.

In another embodiment according to the present invention, the desiccant material can be regenerated by means of hot compressed gad, case in which the dryer 1 can further comprise a pressure sensor (not shown) and a temperature sensor (not shown) mounted on the inlet flow conduit 9 of each of the two adsorption vessels 7 and 8, said dryer 1 determining based on the measured temperature and pressure when the desiccant material provided therein is regenerated.

Preferably, after said predetermined time interval or after said second vessel is regenerated, the dryer 1 brings the inlet flow conduit 9 of the first adsorption vessel 7 in fluid communication with the depressurization unit 13 by bringing the first control valve 11 in a second state, and further brings the inlet flow conduit 9 of the second adsorption vessel 8 in fluid communication with the outlet of the compressor unit 4 by bringing the second control valve 11 into a first state.

At the same time, the dryer is preferably maintaining a minimum volume of fluid flowing between the first adsorption vessel 7 and the second adsorption vessel 8 when the inlet flow conduit 9 of said first adsorption vessel 7 is in fluid communication with the outlet of said compressor unit 4, or is maintaining a minimum flow of fluid flowing between said second adsorption vessel 8 and said first adsorption vessel 7 when the inlet flow conduit of said second adsorption vessel 8 is in fluid communication with the outlet of said compressor unit 4.

Because the dryer 1 according to the present invention comprises said nozzle 17 and because each of the adsorption vessels 7 and 8 is connectable to said flow reducer 14, a continuous functioning of the dryer 1 can be achieved.

Such a continuous functioning is not achievable with existing systems, since they require a pressure build-up interval before switching the phase from regenerating to adsorbing for one adsorption vessel. During said pressure build-up interval, the inlet flow conduit of one adsorption vessel is closed to allow a pressure to build within said adsorption vessel by the circulation of gas through the nozzle positioned between the two adsorption vessels. Only after the pressure within said vessel reaches the pressure value of the adsorption vessel in adsorption phase, the system connects the regenerated adsorption vessel to the compressor unit and changes the phase of the other adsorption vessel to regenerating. In a preferred embodiment according to the present invention, for a achieving a simpler layout, said depressurization unit 13 is connecting the first and/or the second adsorption vessel 7 and/or 8 to the atmosphere during regenerating phase.

Preferably, the dryer is changing the states of the first and second control valves 11 by means of a control unit, communicating through a wired or wireless connection with said first and second control valves 11.

Preferably, when the control unit is maintaining the first or the second control valve 11 in a first state, the flow of compressed gas coming from the outlet of said compressor unit 4 is flowing through the inlet flow conduit 9 of the first or the second adsorption vessel, 7 or 8, and when said control unit is maintaining the first or the second control valve 11 in a second state, the inlet flow conduit 9 of the first or the second adsorption vessel, 7 or 8 respectively, is connected to the depressurization unit 13.

In the context of the present invention said dryer 1 is an adsorption dryer such as for example a pressure swing adsorption dryer, or any other type of adsorption dryer.

The present invention is by no means limited to the embodiments described as an example and shown in the drawings, but such a dryer 1 can be realized in all kinds of variants, without departing from the scope of the invention. Similarly, the invention is not limited to the method for regenerating a desiccant material comprised within at least two adsorption vessels of said dryer described as an example, however, said method can be realized in different ways while still remaining within the scope of the invention.

The invention claimed is:

1. A dryer provided with an inlet for receiving a flow of compressed gas and an outlet for providing dry air, said dryer comprising:
   - a first and a second adsorption vessel connected in parallel, each of said first and second adsorption vessels comprising: an inlet flow conduit connected to said inlet and an outlet flow conduit connected to said outlet for allowing a flow of compressed gas therethrough, a desiccant material provided therein, a control valve provided on said inlet flow conduit, and an outlet valve provided on said outlet flow conduit;
   - a depressurization unit adapted to be connected to the inlet flow conduit of each of said first and second adsorption vessels;
   - wherein the dryer further comprises a flow reducer adapted to be connected to the inlet flow conduit of each of the first and second adsorption vessels and allowing a flow of fluid therethrough, wherein said flow reducer comprises a perforated disk configured in a way to control the flow of compressed gas through the flow reducer, wherein the perforated disk comprises a plurality of perforations provided on both surfaces of the perforated disk, and
   - said control valves are adapted to be switched in a first state in which compressed gas is allowed to flow through the inlet flow conduit of one of said adsorption vessels, and a second state in which one or both of said inlet flow conduits is in fluid connection with the depressurization unit,
   - wherein said flow reducer further comprises an arm structure created in between each two perforations, said arm structure creating a slope gradually increasing in height between the outer circumference of the perforated disk and an elevated central area, and
   - wherein said arm structure is present on both sides of the perforated disk.

2. The dryer according to claim 1, wherein each of said control valves is a two-way valve.

3. The dryer according to claim 2, wherein said control valves are further connected to a spring and a solenoid valve, said solenoid valve, when actuated, allowing said control valve to be switched from a first state, against the force of the spring into the second state.

4. The dryer according to claim 3, further comprising a control unit for actuating said control valves and said solenoid valve.

5. The dryer according to claim 1, wherein the dryer further comprises a nozzle positioned on a flow conduit, said flow conduit connecting the outlet flow conduit of the first adsorption vessel with the outlet flow conduit of the second adsorption vessel.

6. The dryer according to claim 5, wherein said flow conduit connecting the outlet flow conduit of the first adsorption vessel with the outlet flow conduit of the second adsorption vessel is realized in between each of said first and second adsorption vessels and each of the outlet valves.

7. The dryer according to claim 1, wherein said flow reducer is positioned on at least one of the inlet flow conduits, between at least one of the control valves and at least one of said first and/or second adsorption vessels.

8. The dryer according to claim 1, wherein said flow reducer is positioned between said control valves and said depressurization unit.

9. The dryer according to claim 1, wherein said perforated disk is slidable on a shaft in between two end caps.

10. The dryer according to claim 9, wherein said shaft is positioned through the center of said perforated disk.

11. The dryer according to claim 9, wherein said flow reducer comprises two springs, each of said two springs positioned in between the perforated disk and one of the two end caps, respectively.

12. The dryer according to claim 1, wherein said perforations are in a vicinity of an exterior contour.

13. The dryer according to claim 1, wherein said perforations are positioned on at least one surface of the perforated disk such that a distance between a center of the perforated disk and each of the perforations is equal.

14. The dryer according to claim 1, wherein the perforations are symmetrically disposed on at least one surface of the perforated disk.

15. The dryer according to claim 1, wherein the perforated disk is guided by a lateral wall.

* * * * *